(12) United States Patent
Takasaki et al.

(10) Patent No.: US 9,830,866 B2
(45) Date of Patent: *Nov. 28, 2017

(54) DISPLAY DEVICE, ELECTRONIC APPARATUS, AND METHOD FOR DRIVING DISPLAY DEVICE

(71) Applicant: Japan Display Inc., Tokyo (JP)

(72) Inventors: Naoyuki Takasaki, Tokyo (JP); Tsutomu Harada, Tokyo (JP); Susumu Kimura, Tokyo (JP); Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,626

(22) Filed: Jan. 11, 2017

(65) Prior Publication Data

US 2017/0124961 A1    May 4, 2017

Related U.S. Application Data

(63) Continuation of application No. 14/519,766, filed on Oct. 21, 2014.

(30) Foreign Application Priority Data

Oct. 22, 2013 (JP) .................................. 2013-219697
Oct. 21, 2014 (JP) .................................. 2014-214691

(51) Int. Cl.
*G09G 3/34* (2006.01)
*F21V 8/00* (2006.01)
*G09G 3/36* (2006.01)

(52) U.S. Cl.
CPC ........... *G09G 3/342* (2013.01); *G02B 6/0068* (2013.01); *G09G 3/3648* (2013.01);
(Continued)

(58) Field of Classification Search
CPC ....................................................... G09G 3/342
(Continued)

(56) References Cited

U.S. PATENT DOCUMENTS 8,400,395 B2   3/2013   Kim et al.
8,624,943 B2   1/2014   Noguchi et al.
(Continued)

FOREIGN PATENT DOCUMENTS

JP   2010-033014   2/2010
JP   2010-044389   2/2010

*Primary Examiner* — Chad Dicke
(74) *Attorney, Agent, or Firm* — K&L Gates LLP

(57) ABSTRACT

According to an aspect, a display device includes an image display panel; a planar light source including a light guide plate and an edge-lit light source that has light sources; and a controller. The controller sets luminance determination blocks by virtually dividing the image display panel in a light-source-arrangement-direction, identifies a luminance determination block with a highest luminance in the incidence direction, among luminance determination blocks at a same position in the light-source-arrangement-direction, identifies a luminance determination block the luminance of which is to be corrected by referring to luminance information of the light sources, and controls a light quantity of each of the light sources in such a manner that luminance of the identified luminance determination block is achieved.

7 Claims, 24 Drawing Sheets

(52) U.S. Cl.
 CPC .............. *G09G 2300/0452* (2013.01); *G09G 2320/0646* (2013.01); *G09G 2320/0666* (2013.01); *G09G 2330/021* (2013.01); *G09G 2360/16* (2013.01)

(58) Field of Classification Search
 USPC ........................................................ 345/102
 See application file for complete search history.

(56) References Cited

U.S. PATENT DOCUMENTS

| | | | |
|---|---|---|---|
| 2005/0184952 A1 | 8/2005 | Konno et al. | |
| 2009/0322802 A1* | 12/2009 | Noguchi | G09G 3/2003 345/694 |
| 2010/0253696 A1* | 10/2010 | Choi | G09G 3/3426 345/589 |
| 2010/0283802 A1* | 11/2010 | Jung | G09G 3/3426 345/690 |
| 2015/0109352 A1* | 4/2015 | Takasaki | G09G 3/3406 345/690 |

\* cited by examiner

LINEAR INTERPOLATION

POLYNOMIAL INTERPOLATION

FIG.23

| LIGHT SOURCE | LIGHT QUANTITY (%) |
|---|---|
| 56A | 24 |
| 56B | 25 |
| 56C | 25 |
| 56D | 149 |
| 56E | 25 |
| 56F | 98 |

FIG.24

| | PEAK LIGHT SOURCE CURRENT (mA) | LIGHT QUANTITY ALLOCATION (%) |
|---|---|---|
| COMPARATIVE EXAMPLE | 20 | 100 |
| EMBODIMENT | 40　×2 | 50　×1/2 |

512 FILTER GLASS
510 VIDEO DISPLAY SCREEN
511 FRONT PANEL

SHUTTER BUTTON 524
LIGHT EMITTER 521
525 LENS COVER

DISPLAY DEVICE, ELECTRONIC APPARATUS, AND METHOD FOR DRIVING DISPLAY DEVICE

CROSS REFERENCES TO RELATED APPLICATIONS

The present application is a continuation application of U.S. patent application Ser. No. 14/519,766, filed on Oct. 21, 2014, which application claims priority to Japanese Priority Patent Application JP 2013-219697 filed in the Japan Patent Office on Oct. 22, 2013, and JP 2014-214691 filed in the Japan Patent Office on Oct. 21, 2014, the entire content of which is hereby incorporated by reference.

BACKGROUND

1. Technical Field

The present disclosure relates to a display device, an electronic apparatus, and a method for driving a display device.

2. Description of the Related Art

In recent years, a demand for display devices for use in, for example, mobile devices such as a mobile phone and electronic paper has increased. In a display device, one pixel includes a plurality of sub-pixels, each of which emits light of a different color. The single pixel displays various colors by switching on and off display of the sub-pixels. Such display devices have been improved year after year in display properties such as resolution and luminance. However, an increase in the resolution reduces an aperture ratio, and thus increases necessity for an increase in luminance of a backlight to achieve high luminance, which causes a problem of an increase in power consumption of the backlight. To address the problem, there is a technique (such as Japanese Patent Application Laid-open Publication No. 2010-33014) in which a white pixel as a fourth sub-pixel is added to the conventional sub-pixels of red, green, and blue. This technique reduces the current value of the backlight because the luminance is increased by the white pixel, and thereby reduces the power consumption.

Japanese Patent Application Laid-open Publication No. 2010-44389 (JP-A-2010-44389) discloses a light source local dimming control method for controlling dimming of a light source module including a plurality of light source blocks each having a light source providing light to a corresponding image section, the method comprising: primarily determining duty ratios for a first light source and a second light source by using a first target luminance of a first image section adjacent to the first light source and a second target luminance of a second image section adjacent to the second light source that is next to the first light source, respectively; compensating the primarily determined duty ratios by using a target luminance of the remaining image sections excluding the first image section and the second image section among image sections that receive light from the first light source and the second light source; and driving the first light source and the second light source by using driving signals the primarily determined duty ratios of which are compensated.

When the technology disclosed in JP-A-2010-44389 is used in an edge-lit light source including a plurality of light sources aligned at positions facing a plane of incidence that is at least one side surface of the light guide plate, the luminance distribution of the backlight changes complexly, so that power may be wastefully consumed.

For the foregoing reasons, there is a need for a display device, an electronic apparatus, and a method for driving a display device that are capable of reducing the power consumption of each light source included in an edge-lit light source, when controlling the luminance independently for each light source.

SUMMARY

According to an aspect, a display device includes an image display panel; a planar light source including a light guide plate and an edge-lit light source, the light guide plate illuminating the image display panel from a back side, the edge-lit light source including a plurality of light sources arranged facing a plane of incidence that is at least one side surface of the light guide plate; and a controller that controls luminance of each of the light sources independently. The controller sets luminance determination blocks by virtually dividing the image display panel in a light-source-arrangement-direction in which the light sources are aligned and in an incidence direction that is perpendicular to the light-source-arrangement-direction, identifies a luminance determination block with a highest luminance in the incidence direction, when an image is displayed on the image display panel based on information of an input signal of the image, among luminance determination blocks at a same position in the light-source-arrangement-direction, identifies a luminance determination block the luminance of which is to be corrected by referring to luminance information of the light sources, and controls a light quantity of each of the light sources in such a manner that luminance of the identified luminance determination block is achieved.

According to another aspect, an electronic apparatus comprises the display device.

According to another aspect, a method for driving a display device that includes an image display panel and a planar light source including a light guide plate and an edge-lit light source, the light guide plate illuminating the image display panel from a back side, the edge-lit light source including a plurality of light sources arranged facing a plane of incidence that is at least one side surface of the light guide plate, includes: setting luminance determination blocks by virtually dividing the image display panel in a light-source-arrangement-direction in which the light sources are aligned and in an incidence direction that is perpendicular to the light-source-arrangement-direction, identifying a luminance determination block with a highest luminance in the incidence direction, when an image is displayed on the image display panel based on information of an input signal of the image, among luminance determination blocks at a same position in the light-source-arrangement-direction, identifying a luminance determination block the luminance of which is to be corrected by referring to luminance information of the light sources; and controlling a light quantity of each of the light sources in such a manner that luminance of the identified luminance determination block is achieved.

Additional features and advantages are described herein, and will be apparent from the following Detailed Description and the figures.

BRIEF DESCRIPTION OF THE FIGURES

FIG. 23 is an explanatory diagram for explaining the light quantity of each light source according to the present embodiment; and FIG. 24 is an explanatory diagram for explaining the duty ratio of the light sources according to the present embodiment.

DETAILED DESCRIPTION

An embodiment for implementing the present disclosure will be described in detail with reference to the accompanying drawings. The embodiment described below is not intended to limit the scope of the present disclosure in any way. The elements described below include those that are substantially the same with those that can be easily thought of by those skilled in the art. The elements described below may also be combined as appropriate.

Configuration of Display Device

Figure 1:
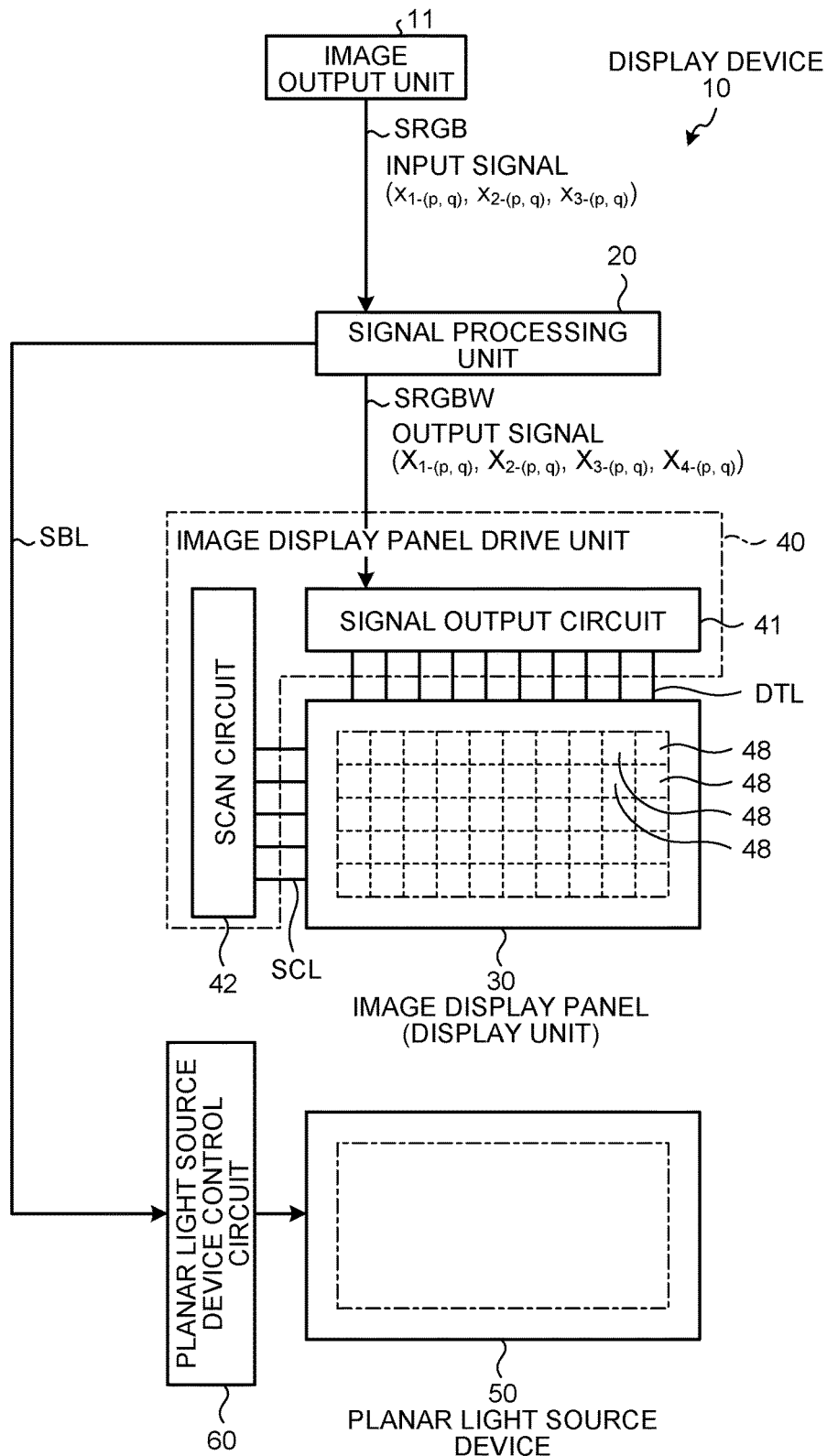
FIG. 1 is a block diagram illustrating an example of a configuration of a display device according to an embodiment.
Figure 2:
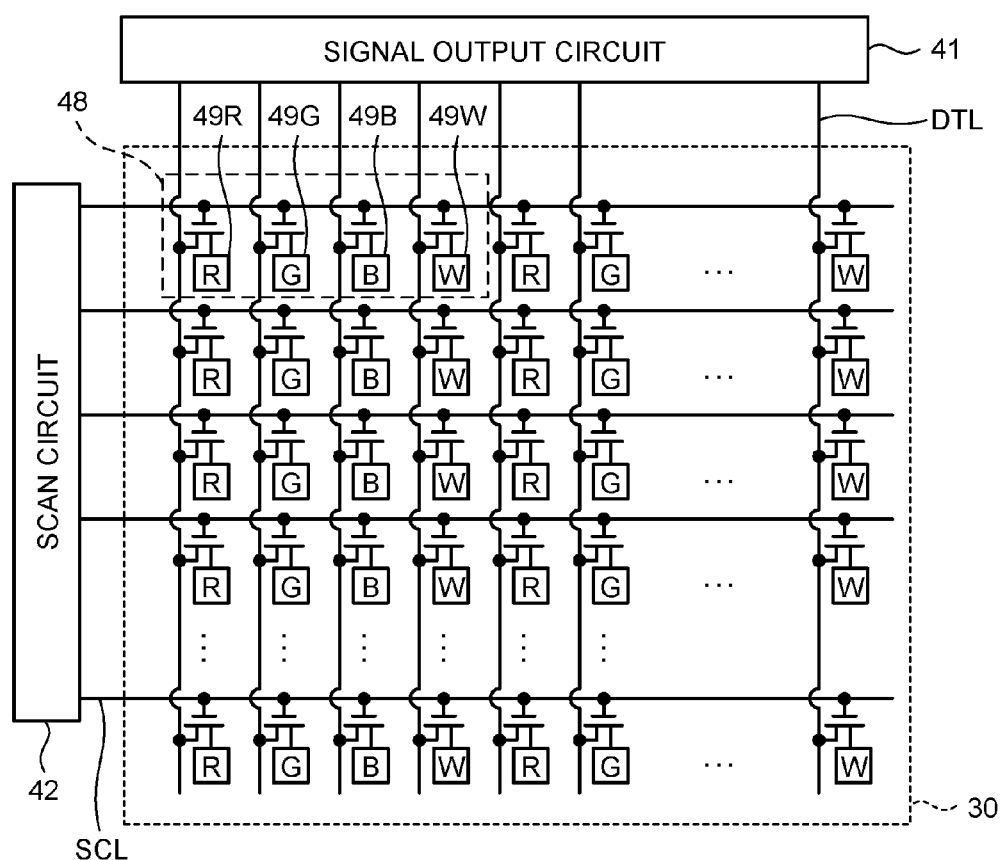
FIG. 2 is a diagram illustrating a pixel array of an image display panel according to the embodiment.

FIG. 1 is a block diagram illustrating an example of a configuration of a display device according to the present embodiment. FIG. 2 is a diagram illustrating a pixel array of an image display panel according to the present embodiment.

As illustrated in FIG. 1, a display device 10 includes a signal processing unit 20, an image display panel (display unit) 30, an image display panel drive unit 40, a planar-light-source-device 50, and a planar-light-source-device-control-unit 60. The signal processing unit 20 receives an input image signal SRGB from an image output unit 11, and transmits an output signal SRGBW to each unit in the display device 10 to control the operations of each unit. The image display panel 30 displays an image based on the output signal SRGBW received from the signal processing unit 20. The image-display-panel-drive-unit 40 controls driving of the image display panel 30. The planar-light-source-device 50 illuminates the image display panel 30 from the back side. The planar-light-source-device-control-unit 60 controls driving of the planar-light-source-device 50. The display device 10 has the same configuration as that of an image display device assembly described in Japanese Patent Application Laid-open Publication No. 2011-154323 (JP-A-2011-154323), and various modifications described in JP-A-2011-154323 are applicable thereto.

The signal processing unit 20 is an arithmetic processing unit that controls the operations of the image display panel 30 and the planar-light-source-device 50. The signal processing unit 20 is coupled to the image-display-panel-drive-unit 40 for driving the image display panel 30 and to the planar-light-source-device-control-unit 60 for driving the planar-light-source-device 50. The signal processing unit 20 processes an externally supplied input signal, and generates output signals and a planar-light-source-device-control-signal. In other words, the signal processing unit 20 generates the output signals by converting input values (input signals) in an input HSV color space of the input signal into extended values (output signals) in an extended HSV color space extended with four colors of a first color, a second color, a third color, and a fourth color, and outputs the generated output signals to the image display panel 30. The signal processing unit 20 outputs the generated output signals to the image-display-panel-drive-unit 40 and the generated planar-light-source-device-control-signal to the planar-light-source-device-control-unit 60.

As illustrated in FIG. 1, pixels 48 are arranged on the image display panel 30 in a two-dimensional matrix of $P_0 \times Q_0$ pixels ($P_0$ pixels in the row direction and $Q_0$ pixels in the column direction). The example illustrated in FIG. 1 illustrates an example in which the pixels 48 are arranged in a matrix-like manner in a two-dimensional coordinate system of X and Y. In this example, the row direction corresponds to the X-direction, and the column direction corresponds to the Y-direction.

The pixels 48 include first sub-pixels 49R, second sub-pixels 49G, third sub-pixels 49B, and fourth sub-pixels 49W. The first sub-pixels 49R display a first primary color (such as red). The second sub-pixels 49G display a second primary color (such as green). The third sub-pixels 49B display a third primary color (such as blue). The fourth sub-pixels 49W display a fourth color (specifically, white). In this manner, each of the pixels 48 arranged in a matrix on the image display panel 30 has a first sub-pixel 49R for displaying the first color, a second sub-pixel 49G for displaying the second color, a third sub-pixel 49B for displaying the third color, and a fourth sub-pixel 49W for displaying the fourth color. The first color, the second color, the third color, and the fourth color are not limited to the first primary color, the second primary color, the third primary color, and the white color, but may be any different colors, e.g., complementary colors. The fourth sub-pixel 49W for displaying the fourth color is preferably brighter, when illuminated with the same light quantity, than the first sub-pixel 49R for displaying the first color, the second sub-pixel 49G for displaying the second color, and the third sub-pixel 49B for displaying the third color. Hereinafter, the sub-pixels will be collectively called sub-pixels 49 when the first sub-pixels 49R, the second sub-pixels 49G, the third sub-pixels 49B, and the fourth sub-pixels 49W need not be distinguished from each other.

More specifically, the display device 10 is a transmissive color liquid crystal display device. As illustrated in FIG. 2, the image display panel 30 is a color liquid crystal display panel. In the image display panel, a first color filter through which the first primary color passes is disposed between a first sub-pixel 49R and an image observer, and a second color filter through which the second primary color passes is disposed between a second sub-pixel 49G and the image observer, and a third color filter through which the third primary color passes is disposed between a third sub-pixel 49B and the image observer. The image display panel 30 has no color filter disposed between a fourth sub-pixel 49W and the image observer. The fourth sub-pixel 49W may be provided with a transparent resin layer instead of the color filter. Providing the fourth sub-pixel 49W with the transparent resin layer allows the image display panel 30 to keep a large difference in level from occurring at the fourth sub-pixel 49W caused by not providing the fourth sub-pixel 49W with the color filter.

The image-display-panel-drive-unit 40 illustrated in FIGS. 1 and 2 is included in a controller according to the present embodiment, and includes a signal output circuit 41 and a scan circuit 42. The image-display-panel-drive-unit 40 uses the signal output circuit 41 to hold and sequentially output video signals to the image display panel 30. The signal output circuit 41 is electrically coupled to the image display panel 30 via signal lines DTL. The image-display-panel-drive-unit 40 uses the scan circuit 42 to select the sub-pixels on the image display panel 30, and controls on and off of switching elements (such as thin film transistors [TFTs]) for controlling operations (optical transmittance) of the sub-pixels. The scan circuit 42 is electrically coupled to the image display panel 30 via scan lines SCL.

Figure 3:
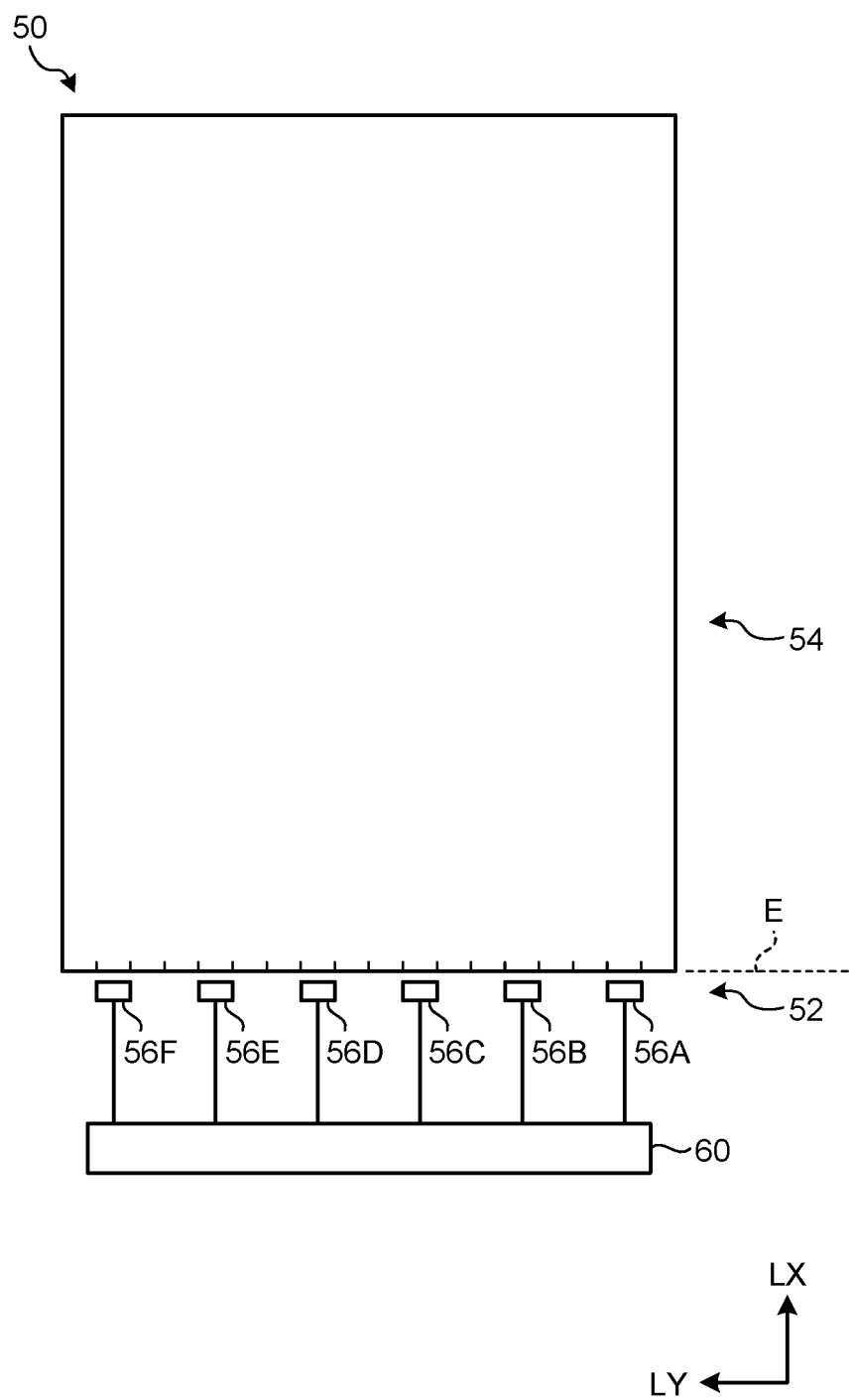
FIG. 3 is an explanatory diagram for explaining a light guide plate and an edge-lit light source according to the present embodiment.

The planar-light-source-device 50 is disposed on the back side of the image display panel 30, and emits light to the image display panel 30 to illuminate the image display panel 30. FIG. 3 is an explanatory diagram for explaining a light guide plate and an edge-lit light source according to the present embodiment. The planar-light-source-device 50 includes a light guide plate 54 and an edge-lit light source 52. The edge-lit light source 52 includes a plurality of light sources 56A, 56B, 56C, 56D, 56E, and 56F aligned at a position facing a plane of incidence E that is at least one side surface of the light guide plate 54. The light sources 56A, 56B, 56C, 56D, 56E, and 56F are light emitting diodes (LEDs) of the same color (e.g., white), for example. The light sources 56A, 56B, 56C, 56D, 56E, and 56F are aligned along one side surface of the light guide plate 54. When LY denotes a light-source-arrangement-direction that is the direction along which the light sources 56A, 56B, 56C, 56D, 56E, and 56F are aligned, the light becomes incident on the plane of incidence E of the light guide plate 54 from the light sources 56A, 56B, 56C, 56D, 56E, and 56F in an incidence direction LX that is perpendicular to the light-source-arrangement-direction LY.

The planar-light-source-device-control-unit 60 controls, for example, the quantity of the light emitted from the planar-light-source-device 50. The planar-light-source-device-control-unit 60 is included in the controller according to the present embodiment. Specifically, the planar-light-source-device-control-unit 60 adjusts the current to be supplied to the planar-light-source-device 50 based on a planar-light-source-device-control-signal SBL received from the signal processing unit 20, thereby controlling the amount (intensity) of the light which illuminates the image display panel 30. The current to be supplied to the planar-light-source-device 50 is adjusted by adjusting the duty ratio of the voltage or the current to be applied to each of the light sources 56A, 56B, 56C, 56D, 56E, and 56F, for example. In other words, the planar-light-source-device-control-unit 60 can control driving of each of the light sources 56A, 56B, 56C, 56D, 56E, and 56F independently, that is, can control the on-off duty ratio of the voltage or the current to be applied to each of the light sources 56A, 56B, 56C, 56D, 56E, and 56F, illustrated in FIG. 3, independently, thereby controlling the quantity (intensity) of light emitted from each of the light sources 56A, 56B, 56C, 56D, 56E, and 56F, independently.

Figure 4:
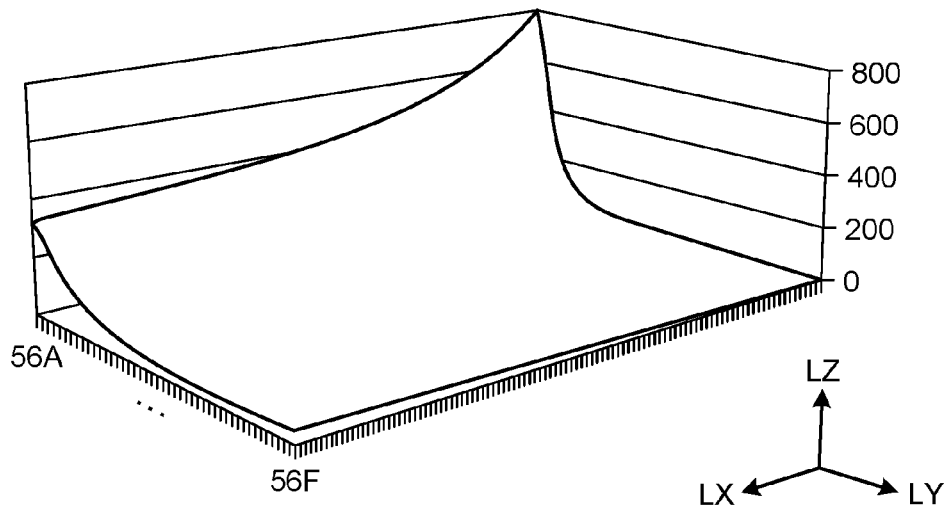
FIG. 4 is an explanatory diagram for explaining an example of a light intensity distribution affected by one of light sources in the edge-lit light source.
Figure 5:
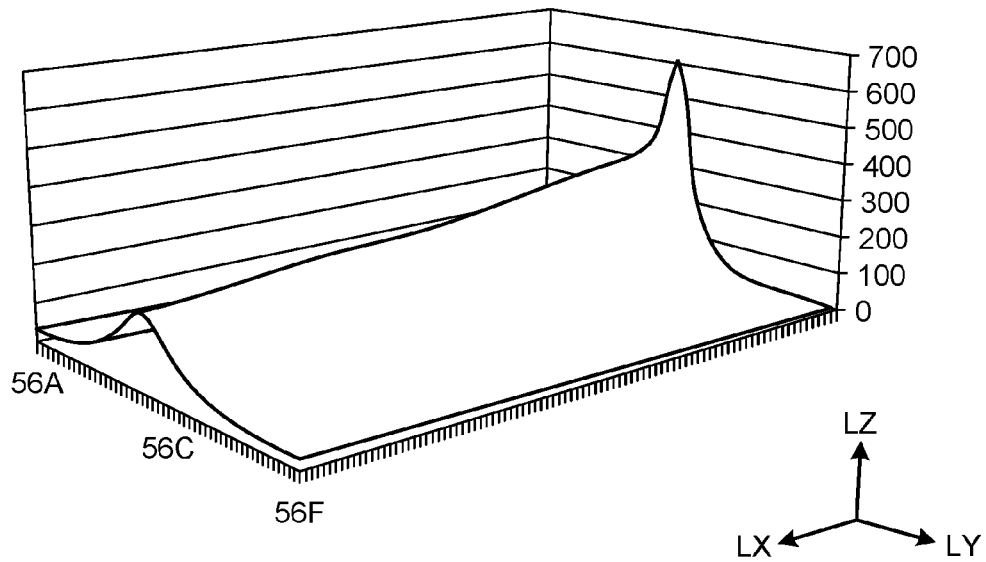
FIG. 5 is an explanatory diagram for explaining an example of a light intensity distribution affected by another one of the light sources in the edge-lit light source.

FIGS. 4 and 5 are explanatory diagrams for explaining examples of a light intensity distribution of one of the light sources provided to the edge-lit light source according to the present embodiment. FIG. 4 illustrates information on a light intensity distribution obtained when the light incident on the light guide plate 54 from the light source 56A is emitted to the plane of the image display panel 30 from the light guide plate 54 in a case where only the light source 56A emits light. When the light from the light source 56A becomes incident on the plane of incidence E of the light guide plate 54 along the incidence direction LX that is perpendicular to the light-source-arrangement-direction LY, the light guide plate 54 illuminates the image display panel 30 from the back side in an illumination direction LZ. In the present embodiment, the illumination direction LZ is perpendicular to the light-source-arrangement-direction LY and the incidence direction LX.

FIG. 5 represents information on a light intensity distribution obtained when the light incident on the light guide plate 54 from the light source 56C is emitted to the plane of the image display panel 30 from the light guide plate 54 in a case where only the light source 56C illustrated in FIG. 3 emits light. When the light from the light source 56C becomes incident on the plane of incidence E of the light guide plate 54 along the incidence direction LX that is perpendicular to the light-source-arrangement-direction LY, the light guide plate 54 illuminates the image display panel 30 from the back side in the illumination direction LZ.

The light intensity distributions of the light emitted from the light source 56A or the light source 56F positioned near the end surfaces of the light guide plate 54 in the light-source-arrangement-direction LY are different from the light intensity distribution of the light emitted from the light source 56C, for example, positioned between the light source 56A and the light source 56F, because the light is reflected on the end surfaces in the light-source-arrangement-direction LY. The planar-light-source-device-control-unit 60 according to the present embodiment, therefore, needs to control the currents to be supplied to or the on-off duty ratios for the respective light sources 56A, 56B, 56C, 56D, 56E, and 56F illustrated in FIG. 3 independently, in the manner to be described later, to control the quantity (intensity) of light to be emitted based on the light intensity distributions of the light emitted from the light sources 56A, 56B, 56C, 56D, 56E, and 56F. A processing operation performed by the display device 10, more specifically, by the signal processing unit 20 will be described below.

Processing Operation of Display Device

Figure 6:
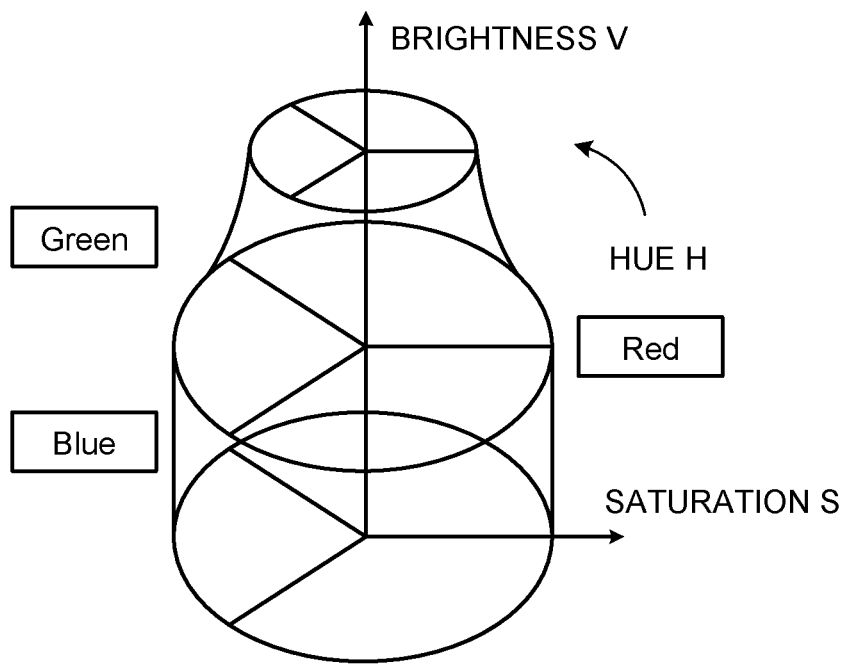
FIG. 6 is a conceptual diagram of an extended HSV color space that is extendable by the display device of the embodiment.
Figure 7:
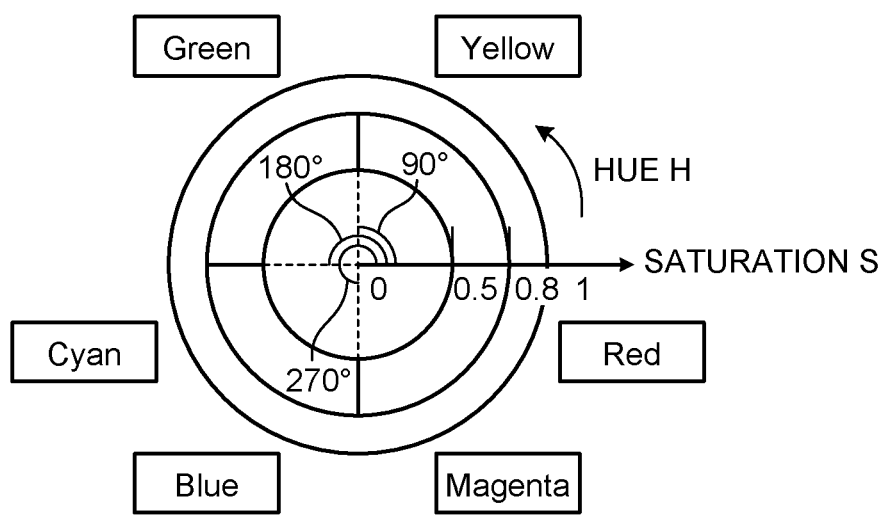
FIG. 7 is a conceptual diagram illustrating a relation between hue and saturation of the extended HSV color space.
Figure 8:
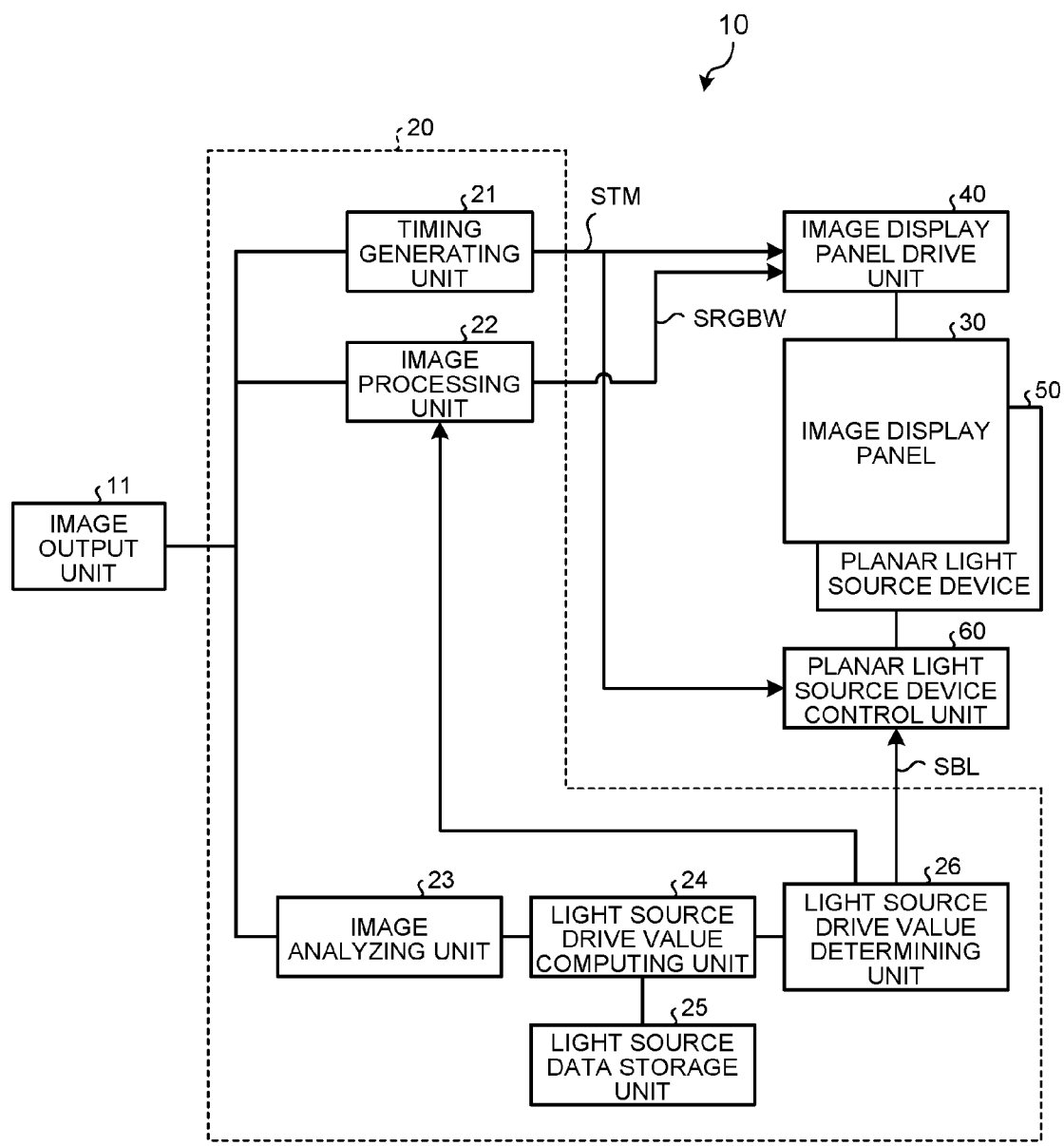
FIG. 8 is a block diagram for explaining a signal processing unit according to the present embodiment.
Figure 9:
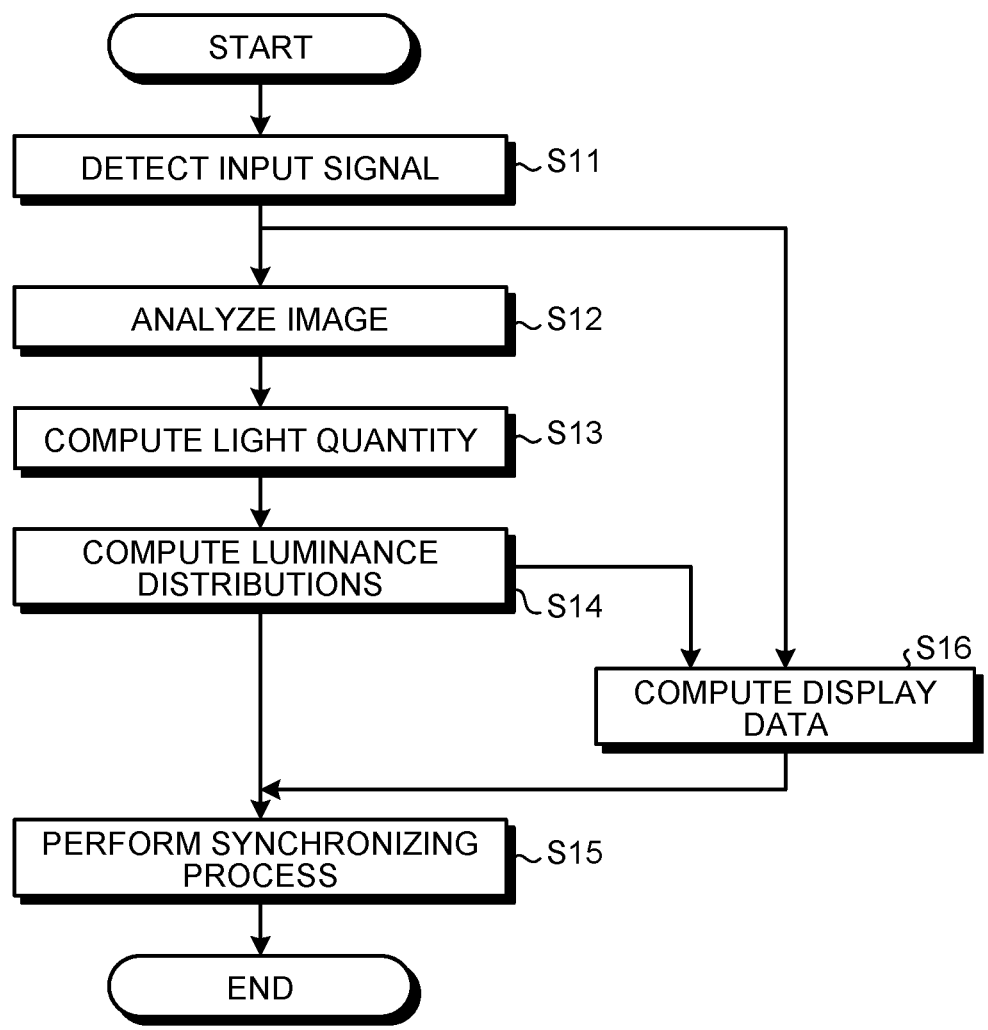
FIG. 9 is a flowchart of a method for driving a display device according to the present embodiment.

FIG. 6 is a conceptual diagram of the extended HSV color space that is extendable by the display device of the present embodiment. FIG. 7 is a conceptual diagram illustrating a relation between hue and saturation of the extended HSV color space. FIG. 8 is a block diagram for explaining a signal processing unit according to the present embodiment. As illustrated in FIG. 1, the signal processing unit 20 receives an input signal SRGB representing the information of an image to be displayed from the external image output unit 11. FIG. 9 is a flowchart of a method for driving a display device according to the present embodiment. The input signal SRGB includes information on images (colors) to be displayed by respective pixels in positions thereof. Specifically, in the image display panel 30 on which $P_0 \times Q_0$ pixels 48 are arranged in a matrix, with respect to the (p, q)th pixel 48 (where $1 \leq p \leq P_0$ and $1 \leq q \leq Q_0$), the signal processing unit 20 receives the signal that includes an input signal for a first sub-pixel 49R having a signal value of $x_{1-(p, q)}$, an input signal for a second sub-pixel 49G having a signal value of $x_{2-(p, q)}$, and an input signal for a third sub-pixel 49B having a signal value of $x_{3-(p, q)}$ (refer to FIG. 1). The signal processing unit 20 includes a timing generating unit 21, an image processing unit 22, an image analyzing unit 23, a light-source-drive-value-computing-unit 24, a light-source-data-storage-unit 25, and a light-source-drive-value-determining-unit 26, as illustrated in FIG. 8.

As illustrated in FIG. 9, the signal processing unit 20 illustrated in FIGS. 1 and 8 detects an input signal SRGB (Step S11). The timing generating unit 21 then processes the input signal SRGB, and sends a synchronizing signal STM for synchronizing the timing of the image-display-panel-drive-unit 40 and the planar-light-source-device-control-unit 60 to the image-display-panel-drive-unit 40 and the planar-light-source-device-control-unit 60 for each frame. The image processing unit 22 of the signal processing unit 20 processes the input signals SRGB to perform the arithmetic step (step S16) to generate an output signal (signal value $X_{1-(p, q)}$) for the first sub-pixel for determining the display gradation of the first sub-pixel 49R, an output signal (signal value $X_{2-(p, q)}$) for the second sub-pixel for determining the display gradation of the second sub-pixel 49G, an output signal (signal value $X_{3-(p, q)}$) for the third sub-pixel for determining the display gradation of the third sub-pixel 49B, and an output signal (signal value $X_{4-(p, q)}$) for the fourth sub-pixel for determining the display gradation of a fourth sub-pixel 49W, and output the generated output signals to the image-display-panel-drive-unit 40. The process of computing the display data according to the present embodiment (Step S16) will now be explained in detail.

By including a fourth sub-pixel 49W that displays the fourth color (white) to a pixel 48, the display device 10 can increase a dynamic range of brightness in the HSV color space (extended HSV color space) as illustrated in FIG. 6. In other words, as illustrated in FIG. 6, the extended HSV color space has a shape obtained by placing a substantially trapezoidal three-dimensional space in which the maximum value of brightness V decreases as a saturation S increases on a cylindrical HSV color space that can be displayed with the first sub-pixel 49R, the second sub-pixel 49G, and the third sub-pixel 49B.

The image processing unit 22 of the signal processing unit 20 stores maximum values Vmax(S) of brightness with the saturation S serving as a variable in the HSV color space extended by the addition of the fourth color (white). In other words, with respect to the solid shape of the HSV color space illustrated in FIG. 6, the signal processing unit 20 stores the maximum values Vmax(S) of brightness for respective pairs of coordinates (values) of the saturation and the hue. Because the input signal includes the input signals for the first sub-pixel 49R, the second sub-pixel 49G, and the third sub-pixel 49B, the HSV color space of the input signal has a cylindrical shape, that is, the same shape as the cylindrical part of the extended HSV color space.

Next, based on at least the input signal (signal value $x_{1-(p, q)}$) and an extension coefficient α for the first sub-pixel 49R, the image processing unit 22 of the signal processing unit 20 calculates an output signal (signal value $X_{1-(p, q)}$) for the first sub-pixel 49R, and outputs the output signal to the first sub-pixel 49R. Based on at least the input signal (signal value $x_{2-(p, q)}$) and the extension coefficient α for the second sub-pixel 49G, the signal processing unit 20 calculates an output signal (signal value $X_{2-(p, q)}$) for the second sub-pixel 49G, and outputs the output signal to the second sub-pixel 49G. Based on at least the input signal (signal value $x_{3-(p, q)}$) and the extension coefficient α for the third sub-pixel 49B, the signal processing unit 20 calculates an output signal (signal value $X_{3-(p, q)}$) for the third sub-pixel 49B, and outputs the output signal to the third sub-pixel 49B. Based on the input signal (signal value $x_{1-(p, q)}$) for the first sub-pixel 49R, the input signal (signal value $x_{2-(p, q)}$) for the second sub-pixel 49G, and the input signal (signal value $x_{3-(p, q)}$) for the third sub-pixel 49B, the signal processing unit 20 calculates an output signal (signal value $X_{4-(p, q)}$) for the fourth sub-pixel 49W, and outputs the output signal to the fourth sub-pixel 49W.

Specifically, the image processing unit 22 of the signal processing unit 20 calculates the output signal for the first sub-pixel 49R based on the extension coefficient α for the first sub-pixel 49R and on the output signal for the fourth sub-pixel 49W. The image processing unit 22 calculates the output signal for the second sub-pixel 49G based on the extension coefficient α for the second sub-pixel 49G and on the output signal for the fourth sub-pixel 49W. The image processing unit 22 calculates the output signal for the third sub-pixel 49B based on the extension coefficient α for the third sub-pixel 49B and on the output signal for the fourth sub-pixel 49W.

In other words, assuming χ as a constant depending on the display device, the signal processing unit 20 uses Equations (1) to (3) listed below to obtain the signal value $X_{1-(p, q)}$ serving as the output signal for the first sub-pixel 49R, the signal value $X_{2-(p, q)}$ serving as the output signal for the second sub-pixel 49G, and the signal value $X_{3-(p, q)}$ serving as the output signal for the third sub-pixel 49B. The output signals are to be output to the (p, q)th pixel (or, the (p, q)th set of the first sub-pixel 49R, the second sub-pixel 49G, and the third sub-pixel 49B).

$$X_{1-(p, q)} = \alpha \cdot x_{1-(p, q)} - \chi \cdot X_{4-(p, q)} \quad (1)$$

$$X_{2-(p, q)} = \alpha \cdot x_{2-(p, q)} - \chi \cdot X_{4-(p, q)} \quad (2)$$

$$X_{3-(p, q)} = \alpha \cdot x_{3-(p, q)} - \chi \cdot X_{4-(p, q)} \quad (3)$$

The signal processing unit 20 obtains the maximum value Vmax(S) of brightness with the saturation S serving as a variable in the HSV color space extended by the addition of the fourth color, and based on the input signal values for the sub-pixels 49 in the pixels 48, obtains saturation values S and brightness values V(S) in the pixels 48.

The saturation S and the brightness V(S) are expressed as S=(Max−Min)/Max and V(S)=Max, respectively. The saturation S can have a value from 0 to 1, and the brightness V(S) can have a value from 0 to $(2^n-1)$. The exponent n is the number of display gradation bits. Max is the maximum value among the input signal value for the first sub-pixel 49R, the input value for the second sub-pixel 49G, and the input value for the third sub-pixel 49B, with respect to the pixels 48. Min is the minimum value among the input signal value for the first sub-pixel 49R, the input value for the second sub-pixel 49G, and the input value for the third sub-pixel 49B, with respect to the pixels 48. A hue H is expressed by a value from 0 degrees to 360 degrees as illustrated in FIG. 7. The hue H changes from 0 degrees toward 360 degrees as red, yellow, green, cyan, blue, magenta, and then red.

In the present embodiment, the signal value $X_{4-(p, q)}$ can be obtained based on the product of $Min_{(p, q)}$ and the extension coefficient α. Specifically, the signal value $X_{4-(p, q)}$ can be obtained based on Equation (4) given below. Although Equation (4) divides the product of $Min_{(p, q)}$ and the extension coefficient α by χ, the equation is not limited to this. The constant χ will be described later.

$$X_{4-(p, q)} = Min_{(p, q)} \cdot \alpha / \chi \quad (4)$$

In general, in the (p, q)th pixel 48, Equations (5) and (6) below can be used to obtain the saturation $S_{(p, q)}$ and the brightness $V(S)_{(p, q)}$ in the cylindrical HSV color space based on the input signal (signal value $x_{1-(p, q)}$) for the first sub-pixel 49R, the input signal (signal value $x_{2-(p, q)}$) for the second sub-pixel 49G, and the input signal (signal value $x_{3-(p, q)}$) for the third sub-pixel 49B.

$$S_{(p, q)} = (Max_{(p, q)} - Min_{(p, q)})/Max_{(p, q)} \quad (5)$$

$$V(S)_{(p, q)} = Max_{(p, q)} \quad (6)$$

$Max_{(p, q)}$ is the maximum value of the input signal values ($x_{1-(p, q)}$, $x_{2-(p, q)}$, and $x_{3-(p, q)}$) for the three sub-pixels 49. $Min_{(p, q)}$ is the minimum value of the input signal values ($x_{1-(p, q)}$, $x_{2-(p, q)}$, and $x_{3-(p, q)}$) for the three sub-pixels 49. The present embodiment assumes that n=8. In other words, the number of display gradation bits is assumed to be eight (the display gradation having a value in 256 levels of gradation from 0 to 255).

The fourth sub-pixel 49W, which displays white color, is not provided with a color filter. The fourth sub-pixel 49W for displaying the fourth color is brighter than the first sub-pixel 49R for displaying the first color, the second sub-pixel 49G for displaying the second color, and the third sub-pixel 49B for displaying the third color, when illuminated with the same light quantity. Suppose that the first sub-pixel 49R is supplied with a signal having a value equivalent to the maximum signal value of the output signal for the first sub-pixel 49R, that the second sub-pixel 49G is supplied with a signal having a value equivalent to the maximum signal value of the output signal for the second sub-pixel 49G, and that the third sub-pixel 49B is supplied with a signal having a value equivalent to the maximum signal value of the output signal for the third sub-pixel 49B. In that case, a collective set of the first sub-pixel 49R, the second sub-pixel 49G, and the third sub-pixel 49B included in the pixel 48 or a group of the pixels 48 is assumed to have a luminance value of $BN_{1-3}$. Furthermore, suppose that the fourth sub-pixel 49W included in the pixel 48 or a group of the pixels 48 is supplied with a signal having a value equivalent to the maximum signal value of the output signal for the fourth sub-pixel 49W. In that case, the fourth sub-pixel 49W is assumed to have a luminance value of $BN_4$. In other words, the collective set of the first sub-pixel 49R, the second sub-pixel 49G, and the third sub-pixel 49B displays white color having a maximum luminance value, and the luminance of the white color is represented by $BN_{1-3}$. Then, assuming x as a constant depending on the display device, the constant χ is expressed as $\chi = BN_4/BN_{1-3}$.

Specifically, suppose that the luminance $BN_{1-3}$ of the white color is obtained when the collective set of the first sub-pixel 49R, the second sub-pixel 49G, and the third sub-pixel 49B is supplied with the input signals having the following values of the display gradation, that is, the signal value $x_{1-(p, q)}$=255, the signal value $x_{2-(p, q)}$=255. Furthermore, suppose that the luminance $BN_4$ is obtained when the fourth sub-pixel 49W is supplied with the input signal having a value 255 of the display gradation. Then, the luminance BN4 has a value, for example, 1.5 times as large as the luminance $BN_{1-3}$. In other words, χ=1.5 is satisfied in the present embodiment.

When the signal value $X_{4-(p, q)}$ is given by Equation (4) above, Vmax(S) can be expressed by Equations (7) and (8) given below.

When $S \leq S_0$, $$V\max(S) = (\chi+1) \cdot (2^n-1) \quad (7)$$

When $S_0 < S \leq 1$, $$V\max(S) = (2^n - 1) \cdot (1/S) \quad (8)$$

where $S_0 = 1/(\chi+1)$.

The signal processing unit 20 stores, for example, as a kind of look-up table, the thus obtained maximum value Vmax(S) of brightness with the saturation S serving as a variable in the HSV color space extended by the addition of the fourth color. Otherwise, the signal processing unit 20 obtains the maximum value Vmax(S) of brightness with the saturation S serving as a variable in the extended HSV color space on a case-by-case basis.

A description will next be made of a method (extension process) of obtaining the signal values $X_{1-(p, q)}$, $X_{2-(p, q)}$, $X_{3-(p, q)}$, and $X_{4-(p, q)}$ serving as the output signals for the (p, q)th pixel 48. The following process is performed so as to keep a ratio among the luminance of the first primary color displayed by the (first sub-pixel 49R+fourth sub-pixel 49W), the luminance of the second primary color displayed by the (second sub-pixel 49G+fourth sub-pixel 49W), and the luminance of the third primary color displayed by the (third sub-pixel 49B+fourth sub-pixel 49W). The following process is performed so as to keep (maintain) a color tone. The following process is performed so as to keep (maintain) gradation-luminance characteristics (gamma characteristics, or γ characteristics). When all of the input signal values are zero or small in any of the pixels 48 or any group of the pixels 48, the extension coefficient α only needs to be obtained without including such a pixel 48 or such a group of the pixels 48.

First Step

First, based on the input signal values for the sub-pixels 49 of the pixels 48, the signal processing unit 20 obtains the saturation S and the brightness V(S) with respect to the pixels 48. Specifically, with respect to the (p, q)th pixel 48, the signal processing unit 20 obtains $S_{(p, q)}$ and $V(S)_{(p, q)}$ by using Equations (7) and (8) based on the signal value $x_{1-(p, q)}$ serving as the input signal for the first sub-pixel 49R, the signal value $x_{2-(p, q)}$ serving as the input signal for the second sub-pixel 49G, and the signal value $x_{3-(p, q)}$ serving as the input signal for the third sub-pixel 49B. The signal processing unit 20 applies this process to all of the pixels 48.

Second Step

Next, the signal processing unit 20 obtains the extension coefficient α(S) based on Vmax(S)/V(S) obtained with respect to the pixels 48.

$$\alpha(S) = V\max(S)/V(S) \quad (9)$$

Third Step

Subsequently, based on at least the signal values $x_{1-(p, q)}$, $x_{2-(p, q)}$, and $x_{3-(p, q)}$, the signal processing unit 20 obtains the signal value $X_{4-(p, q)}$ for the (p, q)th pixel 48. In the present embodiment, the signal processing unit 20 determines the signal value $X_{4-(p, q)}$ based on $\text{Min}_{(p, q)}$, the extension coefficient α, and the constant x. More specifically, the signal processing unit 20 obtains the signal value $X_{4-(p, q)}$ based on Equation (4) given above as described above. The signal processing unit 20 obtains the signal values $X_{4-(p, q)}$ for all of the $P_0 \times Q_0$ pixels 48.

Fourth Step

Thereafter, the signal processing unit 20 obtains the signal value $X_{1-(p, q)}$ for the (p, q)th pixel 48 based on the signal value $x_{1-(p, q)}$, the extension coefficient α, and the signal value $X_{4-(p, q)}$. The signal processing unit 20 obtains the signal value $X_{2-(p, q)}$ for the (p, q)th pixel 48 based on the signal value $x_{2-(p, q)}$, the extension coefficient α, and the signal value $X_{4-(p, q)}$. The signal processing unit 20 obtains the signal value $X_{3-(p, q)}$ for the (p, q)th pixel 48 based on the signal value $x_{3-(p, q)}$, the extension coefficient α, and the signal value $X_{4-(p, q)}$. Specifically, the signal processing unit 20 obtains the signal values $X_{1-(p, q)}$, $X_{2-(p, q)}$, and $X_{3-(p, q)}$ for the (p, q)th pixel 48 based on Equations (1) to (3) given above.

As indicated by Equation (4), the signal processing unit 20 extends the value of $\text{Min}_{(p, q)}$ according to the extension coefficient α. In this manner, the extension of $\text{Min}_{(p, q)}$ according to the extension coefficient α increases the luminance of the white display sub-pixel (fourth sub-pixel 49W), and also increases the luminance of the red display sub-pixel, the green display sub-pixel, and the blue display sub-pixel (corresponding to the first sub-pixel 49R, the second sub-pixel 49G, and the third sub-pixel 49B, respectively) as indicated by Equations given above. This can avoid a problem of occurrence of dulling of colors. Specifically, the extension of the value of $\text{Min}_{(p, q)}$ according to the extension coefficient α increases the luminance of an entire image by a factor of a compared with a case in which the value of $\text{Min}_{(p, q)}$ is not extended. This allows, for example, a still image to be displayed at high luminance, which is desirable.

As illustrated in FIG. 9, the signal processing unit 20 computes the display data (Step S16), and analyzes the image represented by the input signal SRGB (Step S12).

The image analyzing unit 23 analyzes that a signal value $X_{1-(p, q)}$, a signal value $X_{2-(p, q)}$, a signal value $X_{3-(p, q)}$, and a signal value $X_{4-(p, q)}$ for the (p, q)th pixel 48 are extended by a factor of α. In order to achieve an image with the same luminance as that of the image resulting from the signal values not extended, based on the information of the image input signal SRGB, the display device 10 may reduce the quantity of light emitted from the planar-light-source-device 50 based on the extension coefficient α. Specifically, the light-source-drive-value-computing-unit 24 and the light-source-drive-value-determining-unit 26 may control the current or the on-off duty ratio for each of the light sources 56A, 56B, 56C, 56D, 56E, and 56F independently so that the quantity of light emitted from the planar-light-source-device 50 is reduced by (1/α). In the present embodiment, to control the light quantity for each light source, the signal processing unit 20 computes an extension coefficient and an inverse value thereof for each luminance determination block described later, based on the input signal values for the pixels 48 in each luminance determination block. Hereinafter, the extension coefficient for each luminance determination block is represented as $\alpha_b$ and the inverse value of the extension coefficient $\alpha_b$ is represented as $(1/\alpha_b)$.

Figure 10:
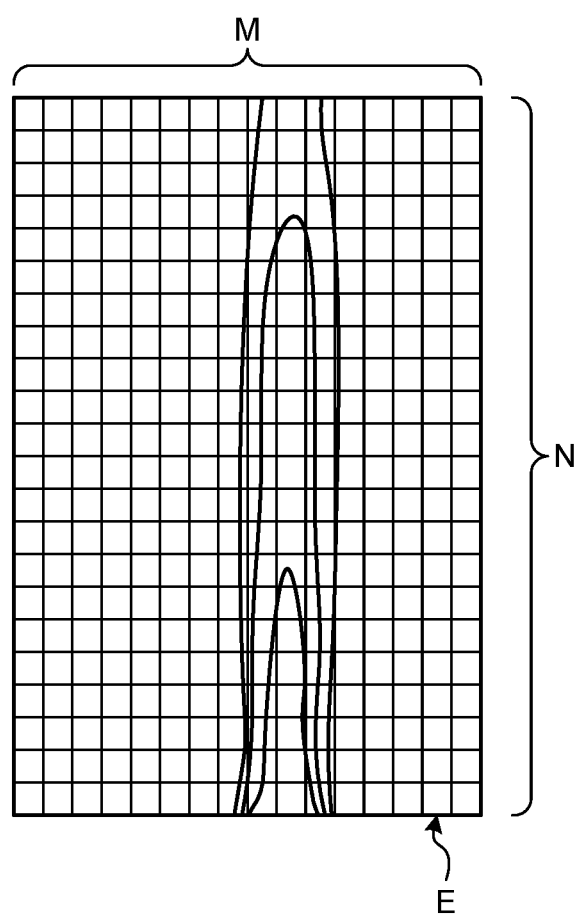
FIG. 10 is a schematic for explaining information on a light intensity distribution of light that is incident on the light guide plate from a specific light source and is emitted to a plane of the image display panel from the light guide plate.
Figure 11:
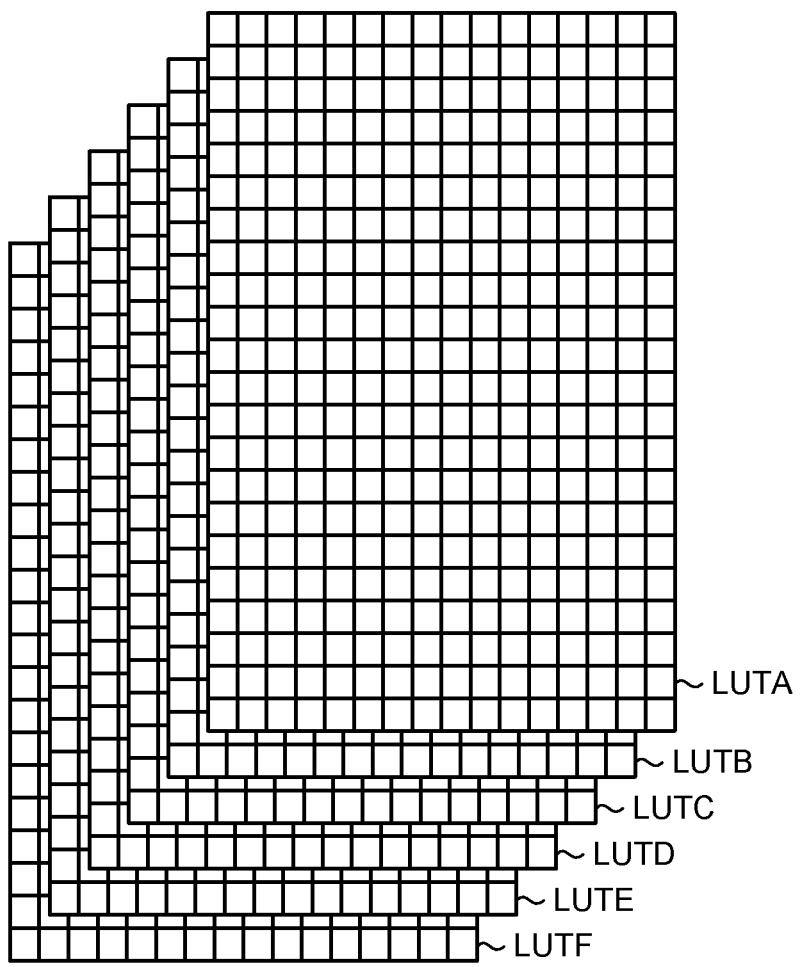
FIG. 11 is a schematic for explaining lookup tables.

Lookup Tables, which are used in a process described later, are explained below. FIG. 10 is a schematic for explaining information on a light intensity distribution of light that is incident on the light guide plate from a specific light source and is emitted to a plane of the image display panel from the light guide plate. FIG. 11 is a schematic for explaining lookup tables. In the present embodiment, the light-source-data-storage-unit 25 stores therein a plurality of lookup tables (LUTs) each of which is data of an array including M×N array elements and stores therein a representative value of the light intensity for each array element. M represents the number of array elements in the light-source-arrangement-direction LY (the number of columns). N represents the number of array elements in the incidence direction LX (the number of rows). For example, M×N array elements may correspond to the respective pixels. The array elements corresponding to the respective pixels may be thinned out at equal intervals and stored in each lookup table. As another example, each of the lookup tables may store therein the representative value of the light intensity for each divided area obtained by virtually dividing the plane of the image display panel 30 into M×N. In this case, the representative value may be, but is not limited to, an average or a median of the light intensity in each divided area, or a light intensity value at any position in each divided area. The data in the lookup tables is the representative value for each divided area, but is not limited thereto. In the present embodiment, the light-source-data-storage-unit 25 stores therein the lookup tables respectively corresponding to the light sources. For example, as illustrated in FIG. 11, the light-source-data-storage-unit 25 stores therein the information on the light intensity distribution (see FIG. 4) obtained when the light incident on the light guide plate 54 from the light source 56A is emitted to the plane of the image display panel 30 from the light guide plate 54 in a case where only the light source 56A illustrated in FIG. 3 emits light with a predetermined light quantity, as a lookup table LUTA. The light-source-data-storage-unit 25 also stores therein the information on a light intensity distribution obtained when the light incident on the light guide plate 54 from the light source 56B is emitted to the plane of the image display panel 30 from the light guide plate 54 in a case where only the light source 56B illustrated in FIG. 3 emits light with the predetermined light quantity, as a lookup table LUTB. The light-source-data-storage-unit 25 also stores therein the information on a light intensity distribution obtained when the light incident on the light guide plate 54 from the light source 56C is emitted to the plane of the image display panel 30 from the light guide plate 54 in a case where only the light source 56C illustrated in FIG. 3 emits light with the predetermined light quantity, as a lookup table LUTC. The light-source-data-storage-unit 25 also stores therein the information on a light intensity distribution obtained when the light incident on the light guide plate 54 from the light source 56D is emitted to the plane of the image display panel 30 from the light guide plate 54 in a case where only the light source 56D illustrated in FIG. 3 emits light with the predetermined light quantity, as a lookup table LUTD. The light-source-data-storage-unit 25 also stores therein the information on a light intensity distribution obtained when the light incident on the light guide plate 54 from the light source 56E is emitted to the plane of the image display panel 30 from the light guide plate 54 in a case where only the light source 56E illustrated in FIG. 3 emits light with the predetermined light quantity, as a lookup table LUTE. The light-source-data-storage-unit 25 also stores therein the information on a light intensity distribution obtained when the light incident on the light guide plate 54 from the light source 56F is emitted to the plane of the image display panel 30 from the light guide plate 54 in a case where only the light source 56F illustrated in FIG. 3 emits light with the predetermined light quantity, as a lookup table LUTF.

The lookup tables LUTA, LUTB, LUTC, LUTD, LUTE, and LUTF according to the present embodiment correspond to the light sources 56A, 56B, 56C, 56D, 56E, and 56F, respectively. The lookup tables according to the present embodiment may be stored for when each pair of the light sources 56A and 56B, the light sources 56C and 56D, and the light sources 56E and 56F emits light at the same time, for example. This configuration can reduce the process for creating the lookup tables and the storage capacity occupied in the light-source-data-storage-unit 25, so that the integrated circuit storing therein the light-source-data-storage-unit 25 can be reduced in size. Because these lookup tables LUTD, LUTE, and LUTF are line-symmetric to the tables LUTA, LUTB, and LUTC with respect to the center line, only the tables LUTA, LUTB, and LUTC positioned on one side of the center line of the light-source-arrangement-direction LY may be generated and stored without storing the lookup tables LUTD, LUTE, and LUTF.

The light-source-drive-value-computing-unit 24 refers to the lookup tables LUTA, LUTB, LUTC, LUTD, LUTE, and LUTF in the light-source-data-storage-unit 25 to compute the light quantity of each of the light sources 56A, 56B, 56C, 56D, 56E, and 56F by superimposing the lookup tables LUTA, LUTB, LUTC, LUTD, LUTE, and LUTF over one another such that each light quantity is reduced by $(1/\alpha_b)$ for each block. For example, the (i, j)th representative luminance (where $1 \le i \le N$, $1 \le j \le M$) obtained by superimposing lookup tables LUTA, LUTB, LUTC, LUTD, LUTE, and LUTF can be computed by Equation (10).

$$L_{(i,j)} = \sum_{k=0}^{n} \{(Ic/\alpha_{k(i,j)}) \times LUTm(P, Q)\} \qquad (10)$$

LUTm(P, Q): Value of Lookup table corresponding to each light source
$I_c/\alpha_k$: Corresponding light source current
m: A to F In this manner, the light-source-drive-value-computing-unit 24 can reduce the amount of computations, because the complex computation is replaced by a simple reference to the lookup tables LUTA, LUTB, LUTC, LUTD, LUTE, and LUTF.

As mentioned earlier, to cause the image-display-panel-drive-unit 40 to make a display on the image display panel 30, a luminance distribution in units of the pixels 48 is required. The light-source-drive-value-determining-unit 26 computes a luminance distribution in units of the pixels 48 based on the light quantity of each of the light sources 56A, 56B, 56C, 56D, 56E, and 56F emit light calculated at Step S13 and the lookup tables LUTA, LUTB, LUTC, LUTD, LUTE, and LUTF (Step S14). To calculate the luminance distribution in units of the pixels 48, luminance information for each pixel 48 is computed by interpolation calculating. The resulting information in units of the pixels 48 would have an extremely large amount of information. However, in the present embodiment, because the lookup tables LUTA, LUTB, LUTC, LUTD, LUTE, and LUTF are created using thinned representative values, the computational load can be reduced.

Figure 12:
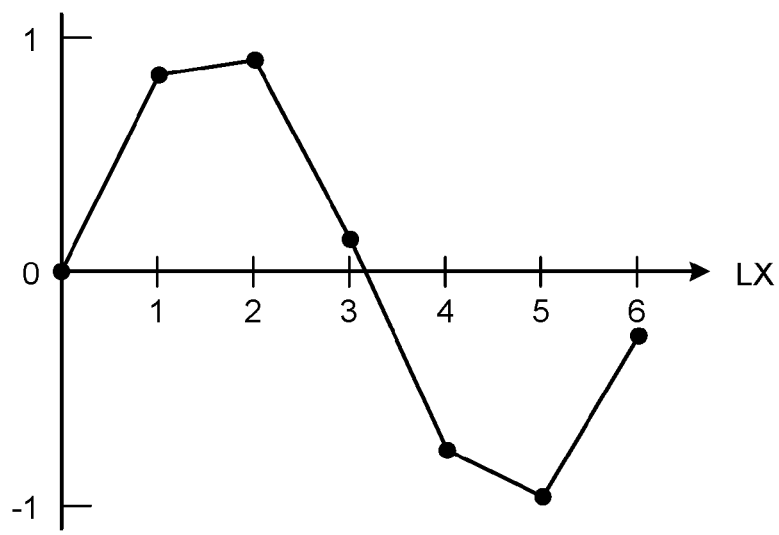
FIG. 12 is an explanatory diagram for explaining a linear interpolation.
Figure 13:
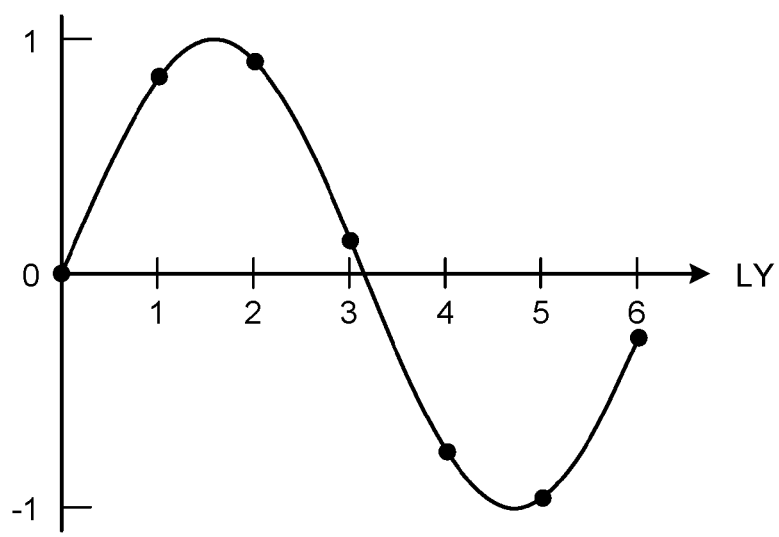
FIG. 13 is an explanatory diagram for explaining a polynomial interpolation.

The luminance information for each pixel 48 changes steeply in the light-source-arrangement-direction LY while the change in the incidence direction LX is gentle. FIG. 12 is an explanatory diagram for explaining a linear interpolation. FIG. 13 is an explanatory diagram for explaining a polynomial interpolation. As the interpolation, the interpolation illustrated in FIG. 12 is applied to the luminance information of the pixels 48 in the incidence direction LX, and the polynomial interpolation illustrated in FIG. 13 is applied to the luminance information of the pixels 48 in the light-source-arrangement-direction LY. An example of the polynomial interpolation is the cubic interpolation. Accordingly, the lookup tables LUTA, LUTB, LUTC, LUTD, LUTE, and LUTF may store therein at least light intensity values at positions corresponding to peaks of the light of the light sources and at positions between the light sources in the light-source-arrangement-direction LY.

Figure 14:
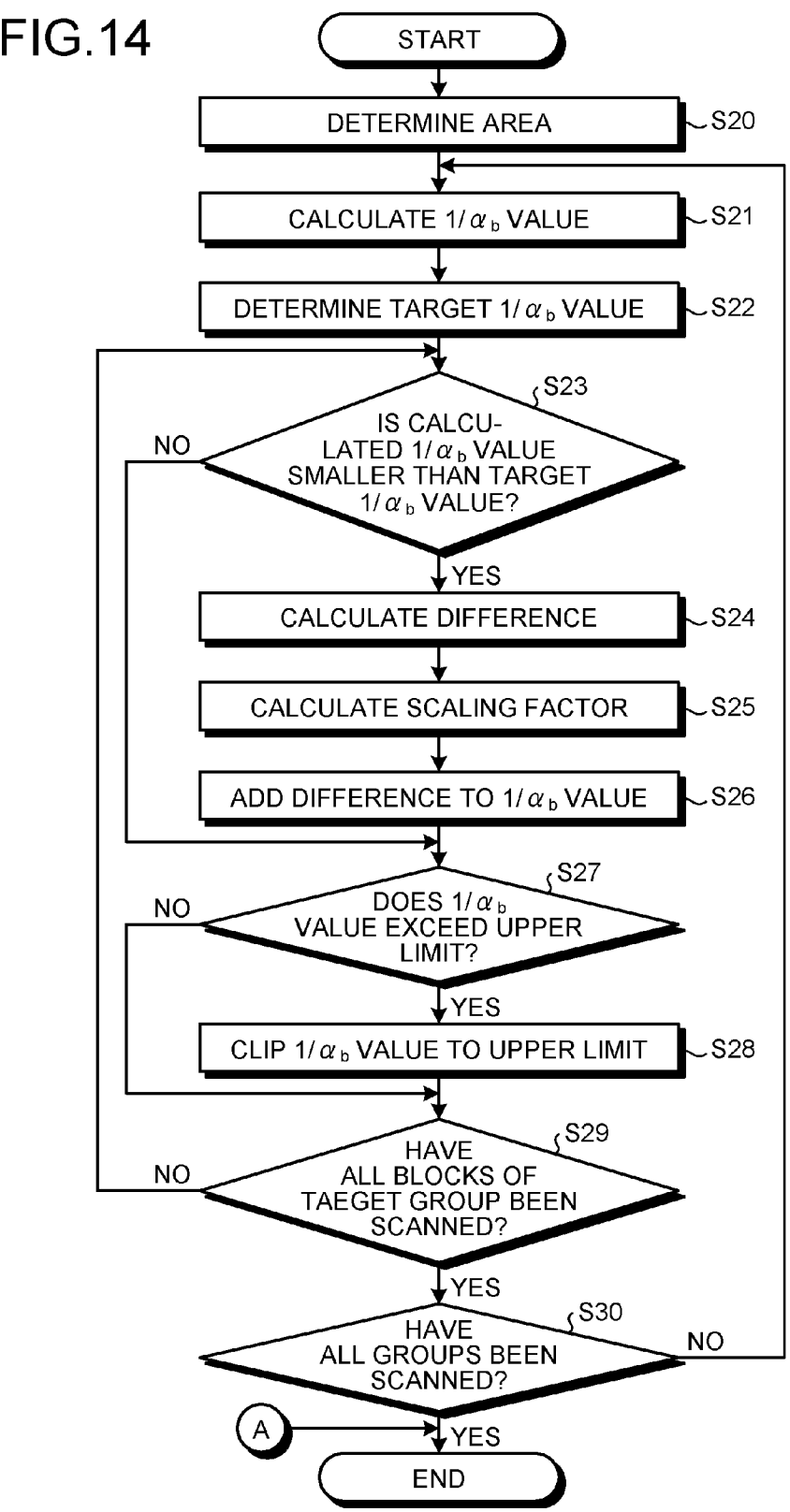
FIG. 14 is a detailed flowchart of a process including an image analysis and a calculation of light source drive values according to the present embodiment.
Figure 15:
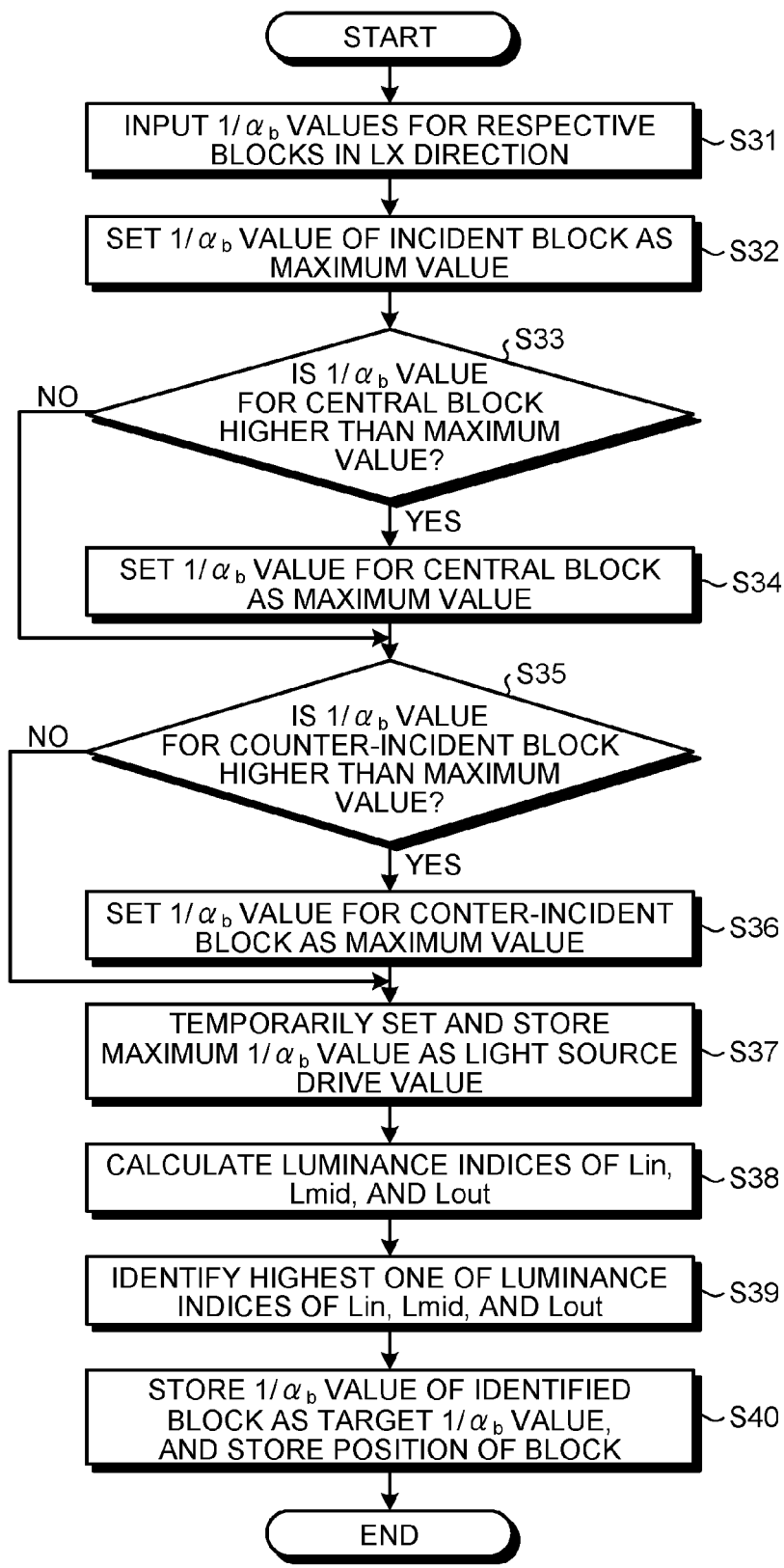
FIG. 15 is a flowchart of a process of determining a light source drive value according to the present embodiment.
Figure 16:
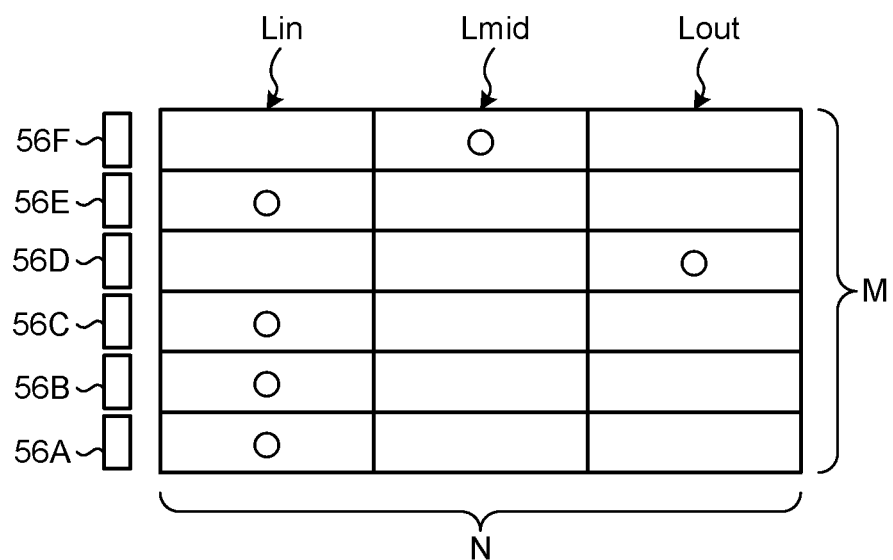
FIG. 16 is an explanatory diagram for explaining identified luminance determination blocks (to which flags are set) according to the present embodiment.

FIG. 14 is a detailed flowchart of a process including an image analysis and a calculation of light source drive values according to the present embodiment. FIG. 15 is a flowchart of a process of determining a light source drive value according to the present embodiment. FIG. 16 is an explanatory diagram for explaining identified luminance determination blocks (to which flags are set) according to the present embodiment. The process of process including the image analysis and the calculation of light source drive values will now be explained with reference to FIGS. 14 to 16. As illustrated in FIG. 14, the image analyzing unit 23 performs an area determination (Step S20). Specifically, the image analyzing unit 23 determines each area of each luminance determination block, which is also simply referred to as a block, in the embodiment. A row of an incident block Lin, a central block Lmid, and a counter-incident block Lout, such blocks being arranged in the incidence direction LX, is arranged in plurality in the light-source-arrangement-direction LY, as illustrated in FIG. 16. The incident blocks Lin, the central blocks Lmid, and the counter-incident blocks Lout are luminance determination blocks that are obtained by virtually dividing the image display panel 30 into a plurality of areas in a matrix-like shape in the light-source-arrangement-direction LY and the incidence direction LX. The luminance determination blocks according to the present embodiment are arranged in six rows in the light-source-arrangement-direction LY, and three columns in the incidence direction LX. The array of the luminance determination blocks including the incident blocks Lin, the central blocks Lmid, and the counter-incident blocks Lout illustrated in FIG. 16 has the number of rows corresponding to the number of the light sources 56A, 56B, 56C, 56D, 56E, and 56F in the light-source-arrangement-direction LY. The number of luminance determination blocks illustrated in FIG. 16 in the incidence direction LX is three including the incident blocks Lin, the central blocks Lmid, and the counter-incident blocks Lout. In the present embodiment, three blocks including the incident blocks Lin, the central blocks Lmid, and the counter-incident blocks Lout at a same position in the light-source-arrangement-direction LY are handled as one group. Therefore, a plurality of groups is arranged in the light-source-arrangement-direction LY. A process described below is performed by sequentially setting each group as a target group.

After a group is set as the target group, in Step S21, the image analyzing unit 23 calculates $(1/\alpha_b)$ value for each luminance determination block, which is included in the target group, in the above-mentioned manner. In Step S22, the light-source-drive-value-computing-unit 24 determines a target $(1/\alpha_b)$ value for the target group. As illustrated in FIG. 15, the light-source-drive-value-computing-unit 24 inputs (obtains) the calculated $(1/\alpha_b)$ values of respective blocks, which are arranged in the incidence direction LX and belong to the target group (Step S31). The light-source-drive-value-computing-unit 24 sets the $(1/\alpha_b)$ value for the incident block Lin as a maximum value (Step S32). If a $(1/\alpha_b)$ value for the central block Lmid of the target group, that is, a $(1/\alpha_b)$ value for the central block Lmid at the same position in the light-source-arrangement-direction LY as the incident block Lin set at Step S32, is higher than the maximum value (Yes at Step S33), the light-source-drive-value-computing-unit 24 sets the $(1/\alpha_b)$ value for the central block Lmid as the maximum value (Step S34). If the $(1/\alpha_b)$ value for the central block Lmid of the target group is equal to or lower than the maximum value (No at Step S33), the $(1/a)$ value for the incident block Lin remains used as the maximum value, and the process proceeds to Step S35.

If the $(1/\alpha_b)$ value for the counter-incident block Lout of the target group, that is, the $(1/\alpha_b)$ value for the counter-incident block Lout at the same position as the incident block Lin set at Step S32 in the light-source-arrangement-direction LY, is higher than the maximum value (Yes at Step S35), the light-source-drive-value-computing-unit 24 sets the $(1/\alpha_b)$ value for the counter-incident block Lout as the maximum value (Step S36). If the $(1/\alpha_b)$ value for the counter-incident block Lout of the target group is equal to or smaller than the maximum value (No at Step S35), the process proceeds to Step S37 without changing the maximum value.

The light-source-drive-value-computing-unit 24 temporarily sets and stores the maximum $(1/\alpha_b)$ value as a light source drive value (Step S37).

Denoting the light source drive value by $(1/\alpha_{i\text{-}max})$, the light-source-drive-value-computing-unit 24 calculates luminance indices of the incident block Lin, the central block Lmid, and the counter-incident block Lout of the target group with Equations (11) to (13) below (Step S38). In the equation below, LUTm(P, Q) represent the data in the Pth row and the Qth column in a lookup table m. The data in the Pth row and the Qth column may be a piece of data for each pixel, a piece of data for each luminance determination block, or a piece of data for each of divided areas obtained by virtually dividing the image display panel 30 into predetermined areas.

$$\text{LuminanceIndex of } L\text{in} = (1/\alpha_{Lin})/\Sigma\{(1/\alpha_{i\ max}) \times \text{LUT}m(P, Q)\} \quad (11)$$

$(1/\alpha_{Lin})$: $1/\alpha$ value for block Lin
$(1/\alpha_{i\ max})$: Light source drive value
LUTm(P, Q): Value of Lookup table corresponding to each light source
m: A to F $$\text{LuminanceIndex of } L\text{mid} = (1/\alpha_{Lmid})/\Sigma\{(1/\alpha_{i-max}) \times \text{LUT}m(P, Q)\} \quad (12)$$

$(1/\alpha_{Lmid})$: $1/\alpha$ value for block Lmid
$(1/\alpha_{i-max})$: Light source drive value
LUTm(P, Q): Value of Lookup table corresponding to each light source
m: A to F $$\text{LuminanceIndex of } L\text{out} = (1/\alpha_{Lout})/\Sigma\{(1/\alpha_{i-max}) \times \text{LUT}m(P, Q)\} \quad (13)$$

$(1/\alpha_{Lout})$: $1/\alpha$ block Lout
$(1/\alpha_{i-max})$: Light sourced rive value
LUTm(P, Q): Value of Lookup table corresponding to each light source
m: A to F The light-source-drive-value-computing-unit 24 identifies highest one of the luminance indices of the incident block Lin, the central block Lmid, and the counter-incident block Lout acquired at Step S38 (Step S39).

The light-source-drive-value-computing-unit 24 then stores the $(1/\alpha_b)$ value corresponding to the luminance index identified at Step S39 as a target $(1/\alpha_b)$ value and stores the position of an identified block that is one of the incident block Lin, the central blocks Lmid, and the counter-incident blocks Lout and corresponds to the identified luminance index (Step S40). In this manner, the identified block serves as a luminance determination block the luminance of which is corrected. The value of $(1/\alpha_b)$ of the identified luminance determination block is used as the target $(1/\alpha_b)$ value for the group to which the identified luminance determination block belongs.

After the light-source-drive-value-computing-unit 24 determines the target $(1/\alpha_b)$ value, the process illustrated in FIG. 15 is ended, and the process proceeds to Step S23 illustrated in FIG. 14. As a result, in an example illustrated in FIG. 16, the luminance determination blocks represents that the maximum values are set for the luminance determination blocks identified by a flag having a circle shape.

Figure 17:
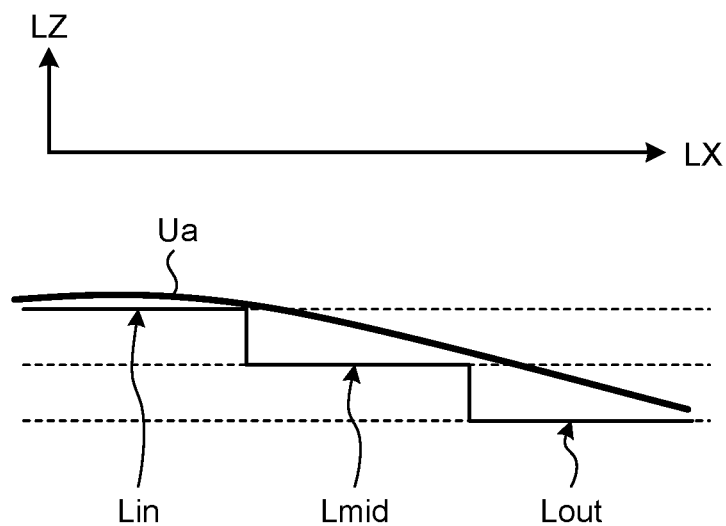
FIG. 17 is an explanatory diagram for explaining an example in which an incident block has the highest luminance, among the luminance determination blocks according to the present embodiment.
Figure 18:
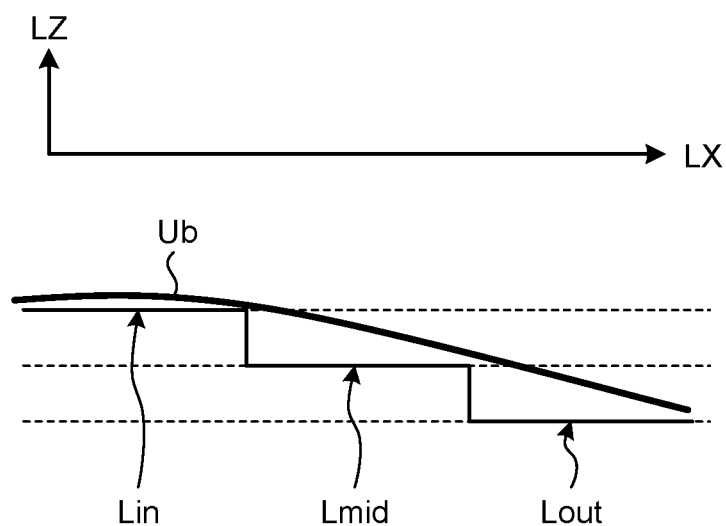
FIG. 18 is an explanatory diagram for explaining the actual luminance of the luminance determination block illustrated in FIG. 17.
Figure 19:
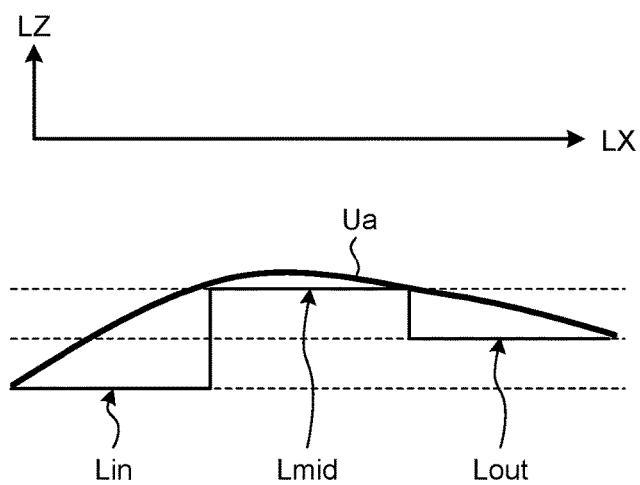
FIG. 19 is an explanatory diagram for explaining an example in which a central block has the highest luminance, among the luminance determination blocks according to the present embodiment.
Figure 20A:
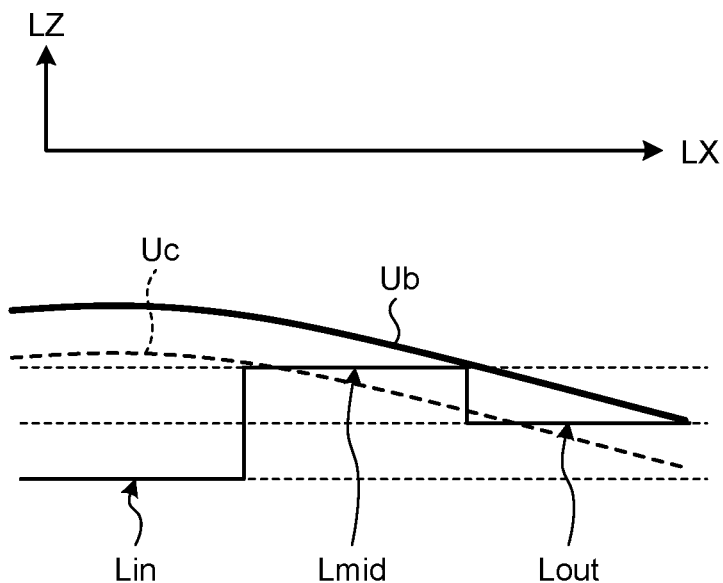
FIG. 20A is an explanatory diagram for explaining the actual luminance of the luminance determination block illustrated in FIG. 19.
Figure 20B:
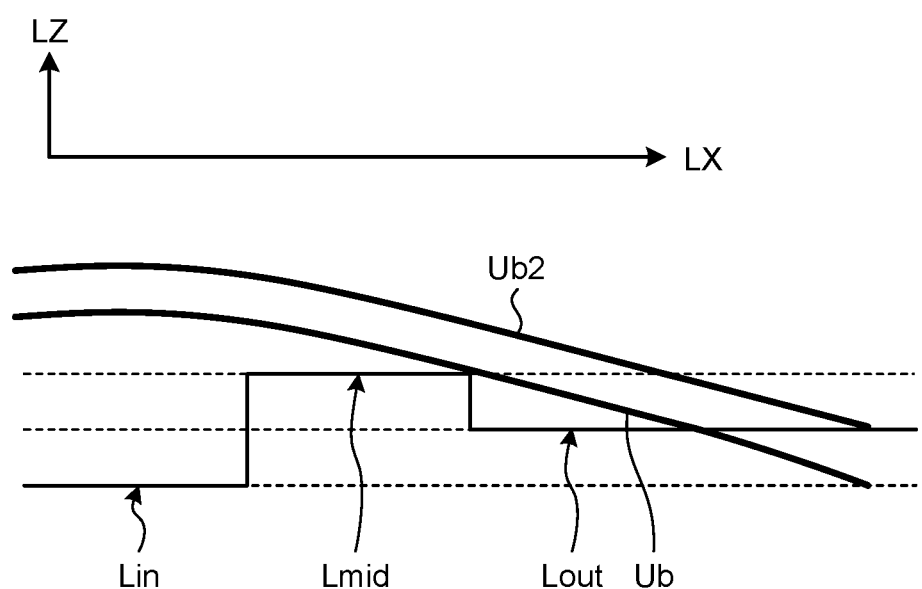
FIG. 20B is an explanatory diagram for explaining the actual luminance of the luminance determination block illustrated in FIG. 19.
Figure 21:
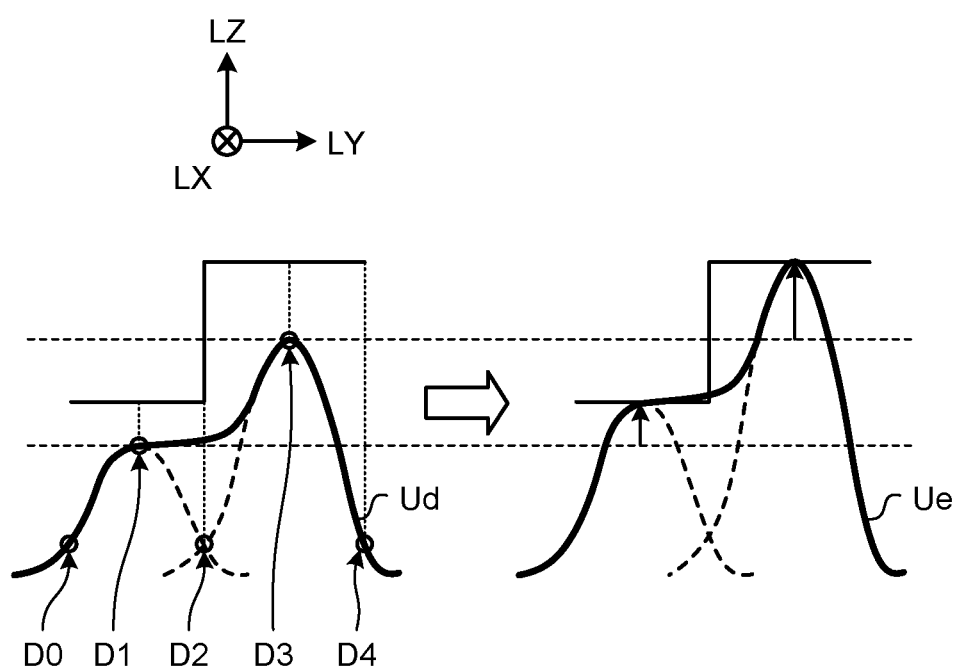
FIG. 21 is a conceptual explanatory diagram for explaining how to increase a light quantity of each light source to complement an insufficiency of luminance in the present embodiment.

Suppose that an incident block Lin has the maximum $(1/\alpha_b)$ value and the maximum luminance index, for example, among the incident block Lin, the central block Lmid, and the counter-incident block Lout at the same position in the light-source-arrangement-direction LY. In this case, a curve Ua that represents an ideal light quantity illustrated in FIG. 17 shows similar values as those in a curve Ub that represents of an actual light quantity illustrated in FIG. 18. This is because the light being incident from a light source has a property to become attenuated as the light moves away from the plane of incidence E. Suppose that the central blocks Lmid has the maximum $(1/\alpha_b)$ value, for example, among the incident block Lin, the central block Lmid, and the counter-incident block Lout at the same position in the light-source-arrangement-direction. In this case, it is difficult to ensure the luminance following the curve Ua representing the ideal light quantity as illustrated in FIG. 19, with one light source alone. The luminance, therefore, needs to be increased in the incident block Lin, despite such a level of luminance is not required in the incident block Lin, and the $(1/\alpha_b)$ value needs to be maximized with respect to the incident block Lin, as indicated by the curve Ub indicating the actual light quantity as illustrated in FIG. 20A. In this case, the luminance index at the central blocks Lmid is the maximum luminance index. If the luminance index is calculated using a luminance intensity value at a position in the central block Lmid nearest to the light source, the $(1/\alpha_b)$ value might fall short for the central block Lmid and the counter-incident block Lout, as indicated by a curve Uc indicating the light quantity. Therefore, the luminance indices need to be calculated using a luminance intensity value at positions most away from the light sources. Furthermore, even when the central block Lmid has the highest $(1/\alpha_b)$ value and the light quantity is adjusted so that the central block Lmid has the required luminance, the resulting light might indicate a property illustrated as a curve Ub in FIG. 20B. In other words, despite the light quantity is adjusted so that the central block Lmid has the required luminance, the counter-incident blocks Lout might not have the required luminance. In such a case, the light quantity need to be set in such a manner that the property illustrated by the curve Ub2 is achieved, which can be determined based on the luminance indices. In other words, in this case, the luminance index at the counter-incident block Lout is the maximum luminance index. According to the present embodiment, the edge-lit light source 52 can control driving of the light sources 56A, 56B, 56C, 56D, 56E, and 56F independently. Therefore, while retaining at least data positions (D0 to D4) corresponding to the peaks and the valleys of the luminance in the light-source-arrangement-direction LY and the luminance at the respective data positions, as illustrated in FIG. 21, at least one or more piece of data is retained for each of the incident block Lin, the central block Lmid, and the counter-incident blocks Lout in the incidence direction LX.

If the calculated $(1/\alpha_b)$ value for a block included in the target group is lower than the target $(1/\alpha_b)$ value of the target group (Yes at Step S23), the difference between the calculated $(1/\alpha_b)$ and the target $(1/\alpha_b)$ value is calculated (Step S24). Next, the light-source-drive-value-computing-unit 24 calculates the scaling factor of the difference (Step S25). The light-source-drive-value-computing-unit 24 calculates how many times of the lookup table at the position the difference corresponds to.

The calculated difference is then added to the calculated $(1/\alpha_b)$ value (Step S26). That is to say, if the calculated $(1/\alpha_b)$ value is lower than the target $(1/\alpha_b)$ value of the block, the difference is added to the calculated $(1/\alpha_b)$ value. Thereby, the insufficient luminance of the block can be compensated. The process then proceeds to Step S27.

On the other hand, if the calculated $(1/\alpha_b)$ value is equal to or higher than the target $(1/\alpha_b)$ value of the target group (No at Step S23), Steps S24 to S26 are skipped and the process proceeds to Step S27. Next, if the $(1/\alpha_b)$ value exceeds an upper limit (Yes at Step S27), the $(1/\alpha_b)$ value is clipped to the $(1/\alpha_b)$ value to the upper limit (Step S28). The process then proceeds to Step S29. On the other hand, if the $(1/\alpha_b)$ value does not exceed the upper limit (No at Step S27), Step S28 is skipped and the process proceeds to Step S29. If all of the blocks included in the target group have not been checked and scanned (processed) yet (No at Step S29), the process is then returned to step S23 to process a block, which has not been scanned, of the target group. If all of the blocks included in the target group have been checked and scanned (Yes at Step S29), the process proceeds to step S30. If the scans with respect to all the groups have finished (Yes at Step S30), the process illustrated in FIG. 14 is ended. If the scans with respect to all the groups have not finished yet (No at Step S30), the next group is set as the target group and the process is then returned to step S21. The light quantity for each light source is calculated based on each $(1/\alpha_b)$ value for each block obtained thus. As described above, $(1/\alpha_b)$ values for blocks belonging to the same group are adjusted to the same value. The adjusted $(1/\alpha_b)$ values are used as the light source drive values $(1/\alpha_k)$ for the respective light sources. The representative luminance is calculated by using the Equation (10) with the light source drive value $(1/\alpha_k)$ and the lookup tables.

The light-source-drive-value-determining-unit 26 then sends the luminance information for each pixel 48, which is calculated in Step S14, to the image processing unit 22. The image processing unit 22 corrects the input signal SRGB based on the luminance information for each pixel 48 (Step S16), and performs a synchronizing process of computing an output signal SRGBW for outputting the signal value $X_{1-(p, q)}$, the signal value $X_{2-(p, q)}$, the signal value $X_{3-(p, q)}$, and the signal value $X_{4-(p, q)}$ for the (p, q)th pixel 48 (Step S15). Based on the synchronizing signal STM, the image-display-panel-drive-unit 40 displays an image on the image display panel 30 for each frame, and the planar-light-source-device-control-unit 60 drives each of the light sources 56A, 56B, 56C, 56D, 56E, and 56F in the planar-light-source-device 50 independently.

As explained above, the display device 10 includes the image display panel 30 and the planar-light-source-device 50. The planar-light-source-device 50 is a planar light source and includes the light guide plate 54 and the edge-lit light source 52. The image-display-panel-drive-unit 40 and the planar-light-source-device-control-unit 60 serving as the controller operate synchronously based on the operations of the signal processing unit 20, and control the light quantity of each of the light sources 56A, 56B, 56C, 56D, 56E, and 56F individually and independently, based on the information of the image input signal SRGB and the respective lookup tables LUTA, LUTB, LUTC, LUTD, LUTE, and LUTF. In this manner, the controller can control to reduce the total amount of light quantities of the light sources 56A, 56B, 56C, 56D, 56E, and 56F so that the power consumption can be reduced.

The luminance determination blocks are set by virtually dividing the image display panel 30 into a plurality of areas in the light-source-arrangement-direction LY and in the incidence direction LX. The controller then identifies which one of the luminance determination blocks at the same position in the light-source-arrangement-direction LY has the highest luminance in the incidence direction LX when an image is displayed on the image display panel based on the information of an input signal representing an image. The controller then identifies a luminance determination block the luminance of which is to be corrected by referring to the lookup tables LUTA, LUTB, LUTC, LUTD, LUTE, and LUTF that are luminance information of the light sources, and controls the light quantity of each of the light sources so that the luminance of the identified luminance determination block is achieved. In this manner, the controller can identify a luminance determination block the luminance of which is to be corrected taking the backlight property into consideration. The display device 10 then controls the light quantity of each of the light sources 56A, 56B, 56C, 56D, 56E, and 56F in the edge-lit light source 52 independently to achieve the luminance of the identified luminance determination block. As a result, the power consumption for each light source can be reduced, and the number of pixels 48 with insufficient luminance can be reduced.

The display device 10 replaces a $(1/\alpha_b)$ value that exceeds the upper limit with the upper limit, so that the luminance can be increased within a permissible range.

First Modification

Figure 22:
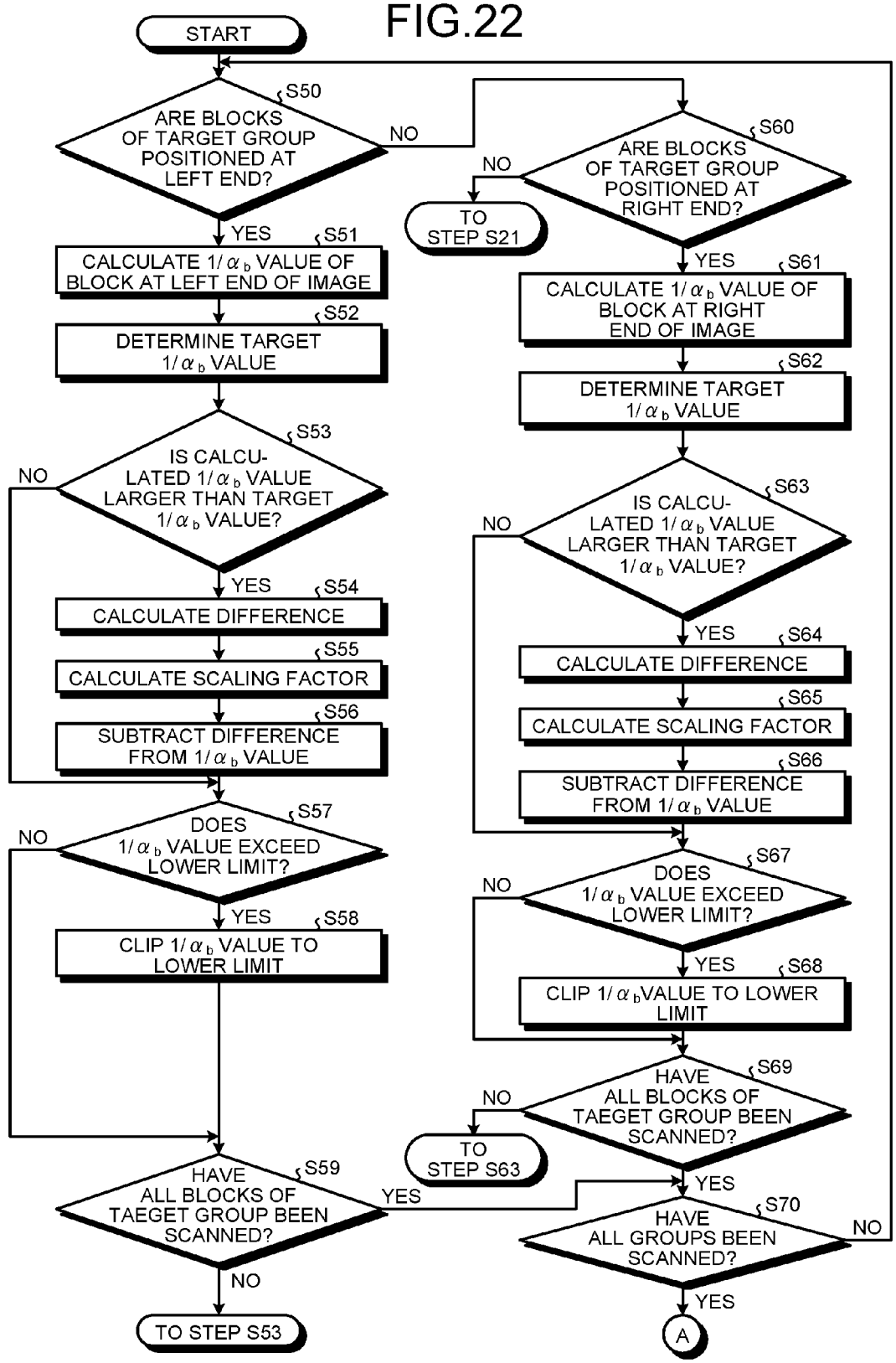
FIG. 22 is a flowchart for explaining a process of subtracting the luminance of a luminance determination block at the right or the left end in the light-source-arrangement-direction according to the present embodiment.

FIG. 22 is a flowchart for explaining a process of subtracting the luminance of a luminance determination block at the right or the left end of the light-source-arrangement-direction according to the present embodiment. As mentioned earlier, because the light becomes reflected on the end surfaces of the light guide plate 54 in the light-source-arrangement-direction LY, the light emitted from the light source 56A and light source 56F positioned near the respective end surfaces in the light-source-arrangement-direction LY has different light intensity distributions from that emitted from the light source 56C, for example, that is positioned between the light source 56A and the light source 56F.

In one modification of the present embodiment, the processing routine as illustrated in FIG. 22 is inserted between Step S20 and Step S21 of FIG. 14. As illustrated in FIG. 22, if luminance determination blocks of the target group are positioned at the left end in the light-source-arrangement-direction LY (Yes at Step S50), the image analyzing unit 23 advances the process to Step S51. Because Steps S51 and S52 are substantially the same as Steps S21 and S22 described above, the explanations thereof are omitted herein.

In Step S53, the light-source-drive-value-computing-unit 24 determined whether the calculated $(1/\alpha_b)$ value for a block included in the target group is higher than the target $(1/\alpha_b)$ value of the target group or not. If the calculated $(1/\alpha_b)$ value for a block included in the target group is higher than the target $(1/\alpha_b)$ value of the target group (Yes at Step S53), Steps S54 to S56 are performed. If the calculated $(1/\alpha_b)$ value for a block included in the target group is equal to or lower than the target $(1/\alpha_b)$ value of the target group (No at Step S53), Steps S54 to S56 are skipped. Because Steps S54 and S55 are substantially the same as Steps S24 and S25 described above, the explanations thereof are omitted herein. In Step S56, the light-source-drive-value-computing-unit 24 subtracts the difference acquired at Step S54 from the $(1/\alpha_b)$ value.

Next, if the resulting $(1/\alpha_b)$ value is higher than a lower limit (Yes at Step S57), the light-source-drive-value-computing-unit 24 clips the $(1/\alpha_b)$ value to the lower limit (Step S58). On the other hand, if the $(1/\alpha_b)$ value is not higher than the lower limit (No at Step S57), Step S58 is skipped and the process proceeds to Step S59. In Step S59, whether all the blocks included in the target group have been scanned or not is determined. If all the blocks included in the target group have been scanned (Yes at Step S59), the process proceeds to Step S70. If all the blocks included in the target group have not been scanned yet (No at Step S59), the process is returned to Step S53 to process (scan) a block, which has not been scanned, of the target group.

On the other hand, if the luminance determination blocks of the target group are not positioned at the left end in the light-source-arrangement-direction LY (No at Step S50), the process proceeds to Step S60. In Step S60, whether the luminance determination blocks of the target group are positioned at the right end in the light-source-arrangement-direction LY or not is determined. If the luminance determination blocks of the target group are not positioned at the right end in the light-source-arrangement-direction LY (No at Step S60), the process proceeds to Step S21 of FIG. 14. On the other hand, if the luminance determination blocks of the target group are positioned at the right end in the light-source-arrangement-direction LY (Yes at Step S60), the process proceeds to Step S61. Because Steps S61 to S68 are substantially the same as Steps S51 to S58 described above, the explanations thereof are omitted herein.

Next, in Step S69, whether all the luminance determination blocks of the target group have been scanned or not is determined. If all the luminance determination blocks of the target group have been scanned (Yes at Step S69), the process proceeds to Step S70. If all the luminance determination blocks of the target group have not been scanned (No at Step S69), the process is returned to Step S63 to process a block, which has not been scanned, of the target group. In Step S70, whether all the groups have been set as a target group and processed (scanned) or not is determined. If all the groups have not been scanned yet (No at Step S70), the next group is set as the target group and the process is then returned to step S50. If all the groups have been scanned (Yes at Step S70), the process of FIG. 22 is ended and the process of FIG. 14 is ended.

The controller thus identifies a luminance determination block with the highest luminance in the incidence direction LX, among those at the right or the left end of the image display panel 30 in the light-source-arrangement-direction LY, and controls the light quantity of each of the light sources to a level below the luminance of the identified luminance determination block. In this manner, the luminance on the right or the left end of the image display panel 30 in the light-source-arrangement-direction LY can be reduced, so that the display device 10 can reduce power consumption.

Second Modification

FIG. 23 is an explanatory diagram for explaining the light quantity of each light source according to the present embodiment. FIG. 24 is an explanatory diagram for explaining the duty ratio of the light sources in the present embodiment. Assuming that the luminance determination blocks are identified as illustrated in FIG. 16 (flags are set to such luminance determination blocks) and the light quantity of each of the light sources is as illustrated in FIG. 23, for example, the position of the counter-incident block Lout in the row corresponding to the light source 56D has higher luminance while the positions surrounding such a position is displayed darker. Therefore, the display quality might become deteriorated when the light quantity allocated to the light source 56D exceeds 100 percent. In a second modification of the present embodiment, the display device 10 achieves the same level of luminance as the conventional display when the peak current of the light sources is set to twice, and all of the light sources are allocated with 50 percent illumination, as illustrated in FIG. 24.

APPLICATION EXAMPLES

Some application examples of the display device 10 explained in the first and the second embodiments, and modifications thereof will now be explained with reference to FIGS. 25 to 33. The present embodiment and the modifications will now be explained as the present embodiment. FIGS. 25 to 33 are diagrams each illustrating an example of an electronic apparatus to which the display device according to the present embodiment is applied. The display device 10 according to the present embodiment may be used in any electronic apparatus in any field, e.g., portable electronic apparatuses such as mobile phones and smartphones, television devices, digital cameras, laptop personal computers, video cameras, and any meter provided to a vehicle. In other words, the display device 10 according to the present embodiment can be applied to electronic apparatuses of all fields that display externally received video signals or internally generated video signals as images or video pictures. Such an electronic apparatus includes a controlling device that supplies video signals to the display device 10 and controls the display device 10.

Application Example 1

Figure 25:
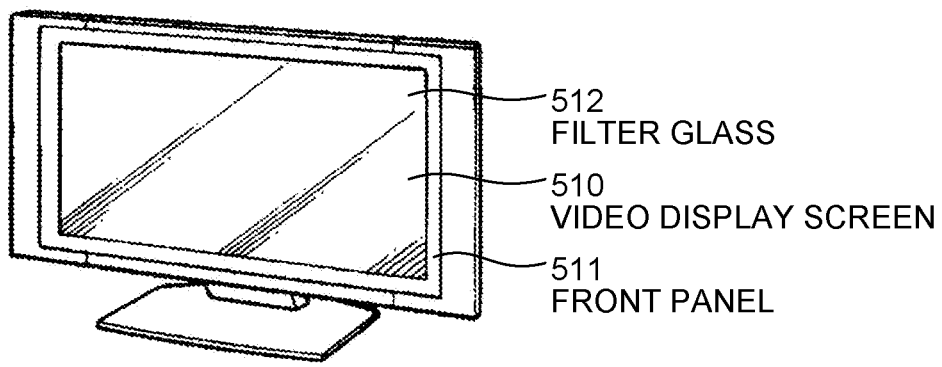
FIG. 25 is a diagram illustrating an example of an electronic apparatus to which the display device according to the embodiment is applied.

The electronic apparatus illustrated in FIG. 25 is a television device to which the display device 10 according to the present embodiment is applied. This television device includes a video display screen 510 having a front panel 511, and a filter glass 512. The display device 10 according to the present embodiment is used as the video display screen 510.

Application Example 2

Figure 26:
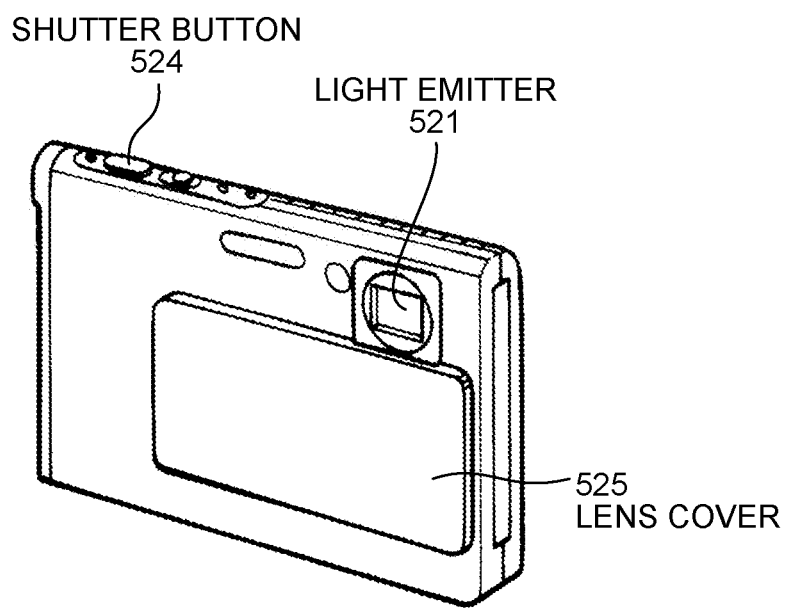
FIG. 26 is a diagram illustrating an example of an electronic apparatus to which the display device according to the embodiment is applied.
Figure 27:
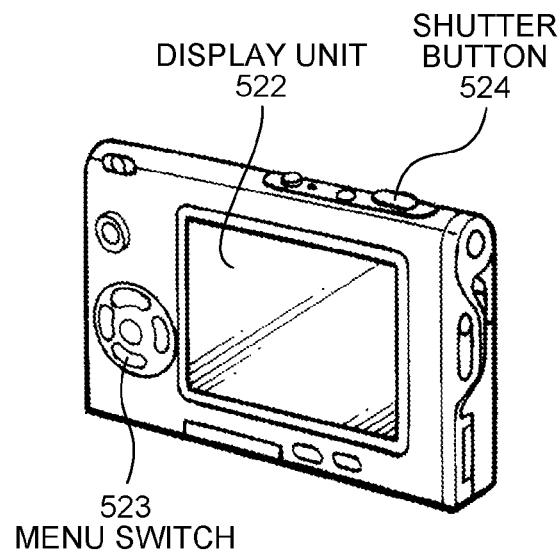
FIG. 27 is a diagram illustrating an example of an electronic apparatus to which the display device according to the embodiment is applied.

The electronic apparatus illustrated in FIGS. 26 and 27 is a digital camera using the display device 10 according to the present embodiment. This digital camera includes a light emitter 521 as a flash, a display unit 522, a menu switch 523, and a shutter button 524. The display device 10 according to the present embodiment is used as the display unit 522. This digital camera has a lens cover 525, as illustrated in FIG. 26, and a photographic lens appears when the lens cover 525 is slid away. The digital camera can take digital photographs by imaging the light incident from the photographic lens.

Application Example 3

Figure 28:
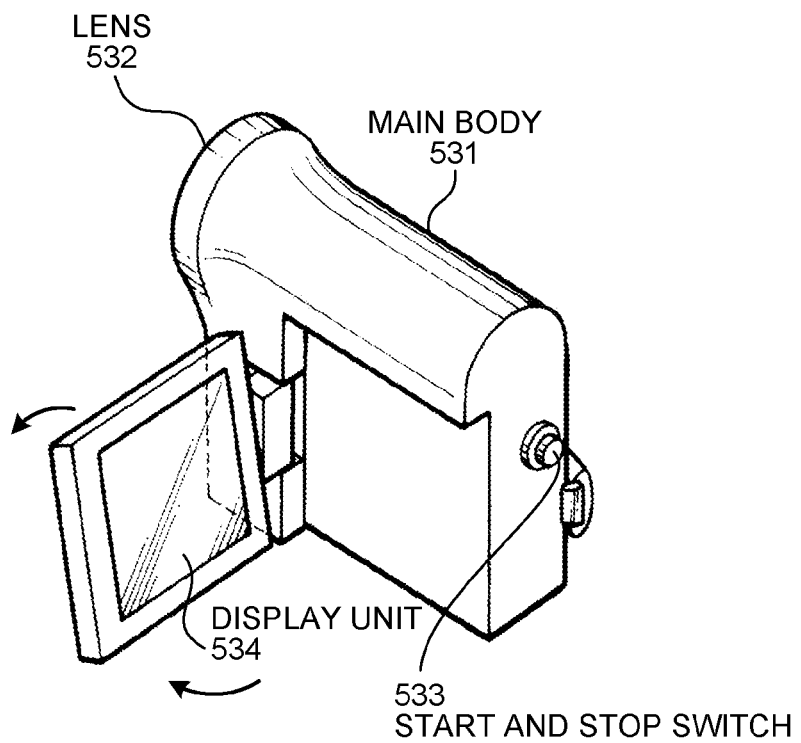
FIG. 28 is a diagram illustrating an example of an electronic apparatus to which the display device according to the embodiment is applied.

The electronic apparatus illustrated in FIG. 28 is a video camera using the display device 10 according to the present embodiment, and FIG. 28 illustrates an external view of the video camera. This video camera includes a main body 531, a subject photographic lens 532 provided on the front side of the main body 531, a shooting start and stop switch 533, and a display unit 534. The display device 10 according to the present embodiment is used as the display unit 534.

Application Example 4

Figure 29:
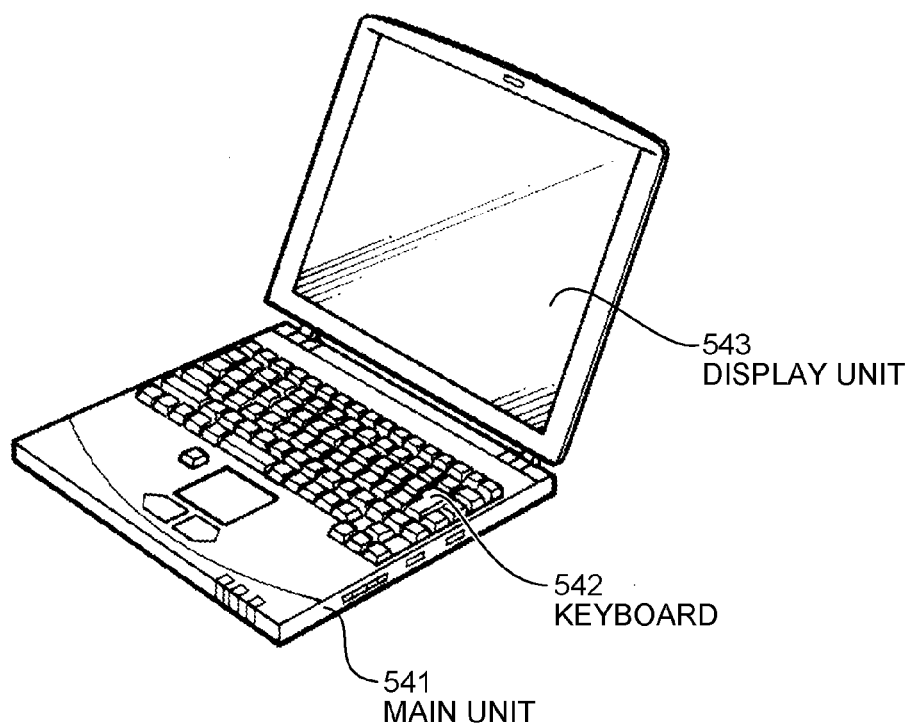
FIG. 29 is a diagram illustrating an example of an electronic apparatus to which the display device according to the embodiment is applied.

The electronic apparatus illustrated in FIG. 29 is a laptop personal computer using the display device 10 according to the present embodiment. The laptop personal computer includes a main unit 541, a keyboard 542 for making operations such as entering characters, and a display unit 543 for displaying images. The display device 10 according to the present embodiment is used as the display unit 543.

Application Example 5

Figure 30:
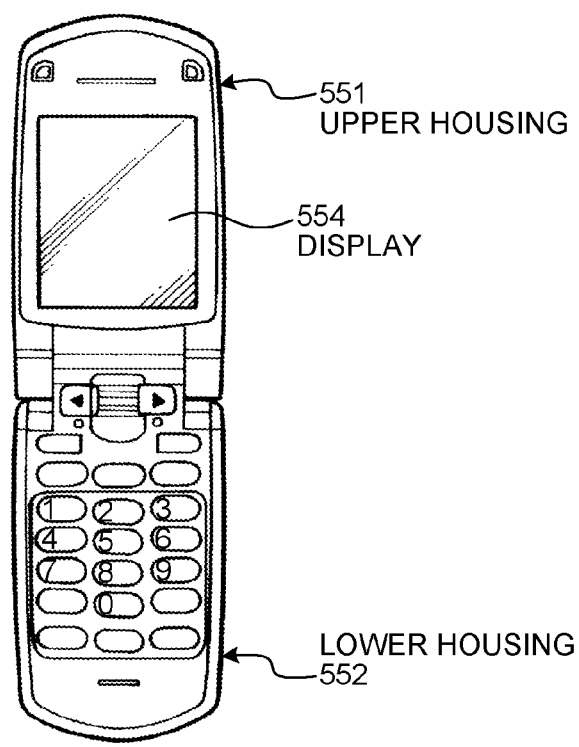
FIG. 30 is a diagram illustrating an example of an electronic apparatus to which the display device according to the embodiment is applied.
Figure 31:
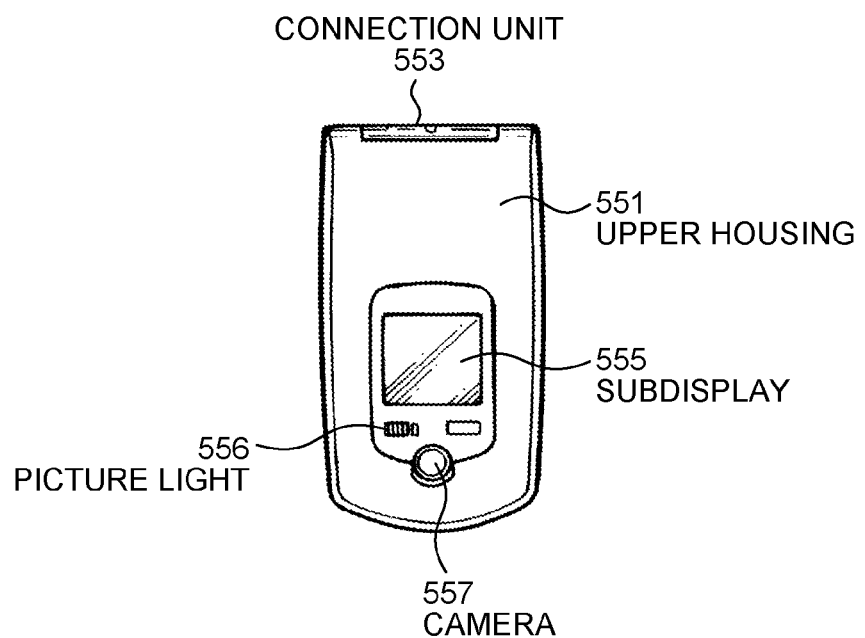
FIG. 31 is a diagram illustrating an example of an electronic apparatus to which the display device according to the embodiment is applied.

The electronic apparatus illustrated in FIGS. 30 to 31 is a mobile phone to which the display device 10 is applied. FIG. 30 is a front view of the mobile phone in the opened state. FIG. 31 is a front view of the mobile phone in the closed state. For example, this mobile phone is composed of an upper housing 551 and a lower housing 552 connected to each other by a connection unit (hinge unit) 553, and includes a display 554, a subdisplay 555, a picture light 556, and a camera 557. The display device 10 serves as the display 554. The display 554 of the mobile phone may have the function of detecting touch operations, in addition to the function of displaying images.

Application Example 6

Figure 32:
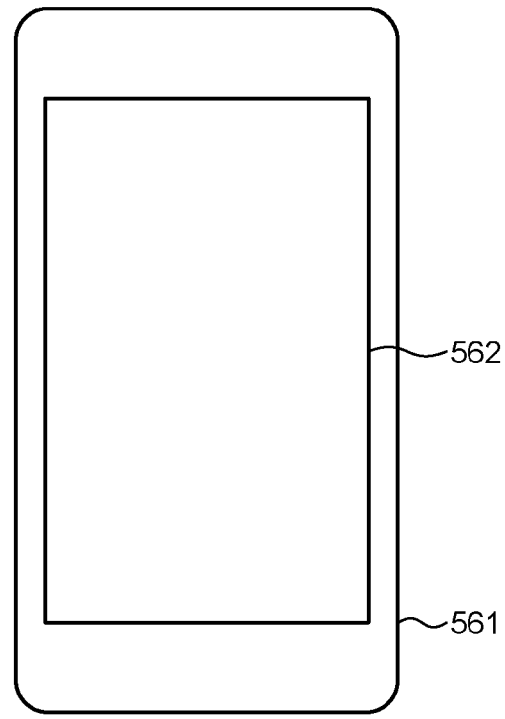
FIG. 32 is a diagram illustrating an example of an electronic apparatus to which the display device according to the embodiment is applied.

The electronic apparatus illustrated in FIG. 32 is a mobile information terminal that operates as a portable computer, a multifunctional mobile phone, a portable computer with voice call capability, or a portable computer with communication capability, and that is also called a smartphone or a tablet computer. Examples of the mobile information terminal include, but are not limited to, a display unit 562 on a surface of a housing 561. The display device 10 according to the present embodiment serves as the display unit 562.

Application Example 7

Figure 33:
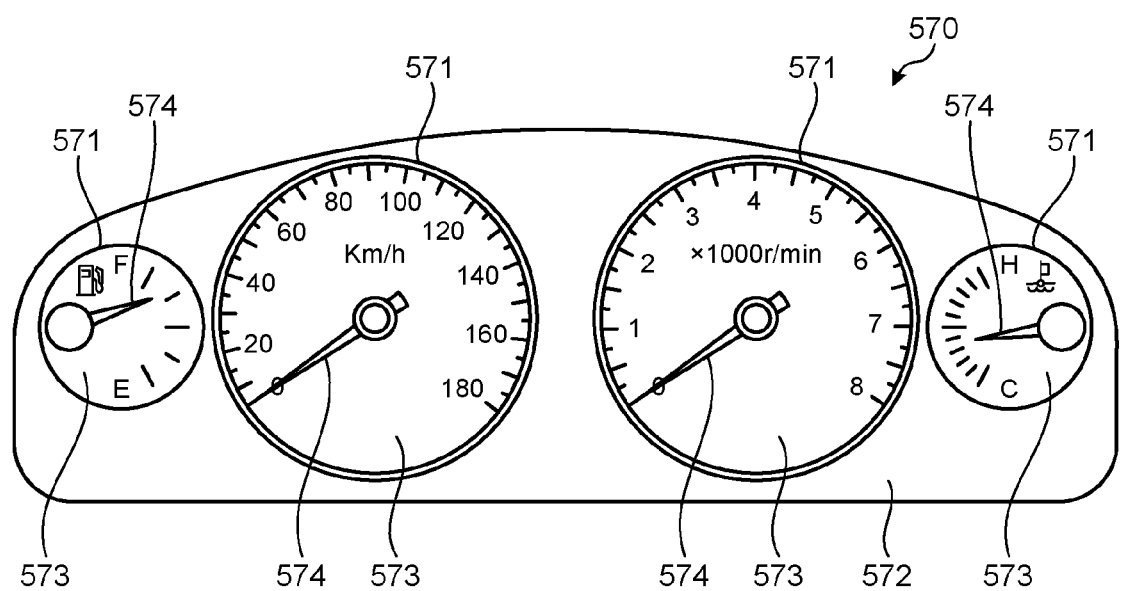
FIG. 33 is a diagram illustrating an example of an electronic apparatus to which the display device according to the embodiment is applied.

FIG. 33 is a schematic of a general structure of a meter unit according to the present embodiment. The electronic apparatus illustrated in FIG. 33 is a meter unit mounted on a vehicle. The meter unit (electronic apparatus) 570 illustrated in FIG. 33 has a plurality of display devices 571 each of which is the display device 10 according to the present embodiment, serving as a fuel meter, a coolant temperature meter, a speed meter, a tachometer, or the like. These display devices 571 are covered by one face panel 572.

Each of the display devices 571 illustrated in FIG. 33 is a combination of a panel 573 that is a display unit and a movement mechanism that is an analog indicator. The movement mechanism includes a motor serving as a driving unit and a pointer 574 rotated by the motor. As illustrated in FIG. 33, the display device 571 can display a scale, indicators, and the like on the display surface of the panel 573, and the pointer 574 of the movement mechanism can be rotated on the display surface of the panel 573.

In the example illustrated in FIG. 33, the display device 571 is provided in plurality on the face panel 572 provided in singularity, but implementations are not limited thereto. For example, the display device 571 may be provided in singularity in the area surrounded by the face panel 572, and the fuel meter, the coolant temperature meter, the speed meter, the tachometer, and the like may be displayed in the display device.

According to the present embodiment, it is possible to provide a display device, an electronic apparatus, and a method for driving a display device capable of reducing the power consumption for each light source included in an edge-lit light source, when controlling the luminance independently for each light sources.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
an image display panel;
a planar light source including
a light guide plate having a light emitting surface extending in an LX direction and an LY direction that is perpendicular to the LX direction, and configured to illuminate the image display panel from a back side thereof, and
an edge-lit light source including a plurality of light sources and facing a plane of light incidence extending in the LY direction and an LZ direction that is perpendicular to both the LY and LX directions, the plane of light incidence including at least one side surface of the light guide plate; and
a controller configured to
control a luminance of each of the light sources,
set an array of luminance determination blocks by virtually dividing the image display panel in the LX direction, from the luminance determination blocks aligned in the LX direction, identify a highest luminance determination block with a highest luminance when an image is displayed on the image display panel based on information of an input signal of the image, from the luminance determination blocks, identify a to-be-corrected luminance determination block, the luminance of which is to be corrected, based on luminance information of the light sources and based on the identified highest luminance determination block, and
control a light quantity of each of the light sources in such a manner that luminance of the identified to-be-corrected luminance determination block is achieved,
wherein the luminance information of the light sources is information on light intensity distributions of light incident on the light guide plate from the light sources and emitted to a plane of the image display panel from the light guide plate,
wherein the controller is further configured to calculate a luminance index of each luminance determination block by
multiplying the light intensity indicated by the luminance information of each respective luminance block in the LX direction by a light source drive value $1/\alpha b$ of the identified highest luminance determination block, said light source drive value $1/\alpha b$ being an inverse of an extension coefficient $\alpha b$ that is measured as $Vmax(S)/V(S)$, where V is a brightness with a saturation S serving as a variable in an HSV color space;
adding up the multiplication results, and
dividing the light source drive value of each luminance determination block in the LX direction by the addition result, and
wherein the controller is further configured to compare the division results as the luminance indexes between all the luminance determination blocks to identify a luminance determination block having the highest luminance index as the to-be-corrected luminance determination block.

2. The display device according to claim 1,
wherein the light sources are arranged in the LY direction,
wherein the luminance information of the light sources is information on light intensity distributions of light incident on the light guide plate from the respective light sources and emitted to a plane of the image display panel from the light guide plate,
wherein the controller is configured to
independently control the luminance for each of the light sources,
set an array of luminance determination blocks by virtually dividing the image display panel in the LX and LY directions,
for each group of luminance determination blocks aligned in the LX direction, identify the highest luminance determination block with the highest luminance when an image is displayed on the image display panel based on information of an input signal of the image,
for each group of luminance determination blocks, identify a to-be-corrected luminance determination block, the luminance of which is to be corrected, based on luminance information of the light sources and based on the identified highest luminance determination block in each group, and
for each group of luminance determination blocks, control a light quantity of each of the light sources in such a manner that luminance of the identified to-be-corrected luminance determination block is achieved,
wherein the controller is further configured to calculate the luminance index of each luminance determination block by:
multiplying the light intensity indicated by the luminance information by a light source drive value of the identified highest luminance determination block in a corresponding group;
adding up the multiplication results for each group; and
dividing the light source drive value of each luminance determination block by the addition result of the corresponding group, and
wherein the controller is further configured to compare the division results as the luminance indexes between all the luminance determination block in each group to identify a luminance determination block having the highest luminance index in each group as the to-be-corrected luminance determination block in each group.

3. The display device according to claim 2, wherein the controller is further configured to:
identify, for each of the rightmost and leftmost groups of luminance determination blocks, a highest luminance determination block with a highest luminance,
identify a to-be-corrected luminance determination block the luminance of which is to be corrected by referring to luminance information of the light sources, and control a light quantity of each of the light sources in such a manner that luminance of a same level as that of the identified to-be-corrected luminance determination block is achieved.

4. The display device according to claim 1, wherein each of pixels arranged in a matrix on the image display panel has a first sub-pixel for displaying a first color, a second sub-pixel for displaying a second color, a third sub-pixel for displaying a third color, and a fourth sub-pixel for displaying a fourth color.

5. The display device according to claim 4, wherein the controller is further configured to:
calculate an output signal for the first sub-pixel based on at least an input signal for the first sub-pixel and the extension coefficient, and outputs the output signal to the first sub-pixel;
calculate an output signal for the second sub-pixel based on at least an input signal for the second sub-pixel and the extension coefficient, and outputs the output signal to the second sub-pixel;
calculate an output signal for the third sub-pixel based on at least an input signal for the third sub-pixel and the extension coefficient, and outputs the output signal to the third sub-pixel; and calculate an output signal for the fourth sub-pixel based on the input signal for the first sub-pixel, the input signal for the second sub-pixel, the input signal for the third sub-pixel, and the extension coefficient, and outputs the output signal to the fourth sub-pixel, and
wherein the extension coefficient is computed based on the luminance of the identified luminance determination block, and is set independently to each of the luminance determination blocks at a same position in the LY direction.

6. An electronic apparatus comprising the display device according to claim 1.

7. A method for driving a display device that comprises an image display panel and a planar light source including a light guide plate having a light emitting surface extending in an LX direction and an LY direction that is perpendicular to the LX direction, and configured to illuminate the image display panel from a back side thereof, and an edge-lit light source including a plurality of light sources and facing a plane of light incidence extending in the LY direction and an LZ direction that is perpendicular to both the LY and LX directions, the plane of light incidence including at least one side surface of the light guide plate, the method comprising:
setting an array of luminance determination blocks by virtually dividing the image display panel in the LX direction,
identifying, from the luminance determination blocks aligned in the LX direction, a to-be-corrected luminance determination block with a highest luminance, when an image is displayed on the image display panel based on information of an input signal of the image,
identifying, from the luminance determination blocks, a to-be-corrected luminance determination block, the luminance of which is to be corrected, based on luminance information of the light sources and based on the identified highest luminance determination block; and
controlling a light quantity of each of the light sources in such a manner that luminance of the identified to-be-corrected luminance determination block is achieved,
wherein the luminance information of the light sources is information on light intensity distributions of light incident on the light guide plate from the light sources and emitted to a plane of the image display panel from the light guide plate,
wherein the method further comprises calculating a luminance index of each luminance determination block by multiplying the light intensity indicated by the luminance information of each respective luminance block in the LX direction by a light source drive value $1/\alpha b$ of the identified highest luminance determination block, said light source drive value $1/\alpha b$ being an inverse of an extension coefficient $\alpha b$ that is measured as $Vmax(S)/V(S)$, where V is a brightness with a saturation S serving as a variable in an HSV color space;
adding up the multiplication results; and
dividing the light source drive value of each luminance determination block in the LX direction by the addition result, and
wherein the method further comprises comparing the division results as the luminance indexes between all the luminance determination blocks to identify a luminance determination block having the highest luminance index as the to-be-corrected luminance determination block.

\* \* \* \* \*